US012606941B2

(12) United States Patent
Viard et al.

(10) Patent No.: US 12,606,941 B2
(45) Date of Patent: Apr. 21, 2026

(54) REINFORCING MATERIAL COMPRISING TWISTED CARBON THREADS FOR THE MANUFACTURE OF COMPOSITE PARTS, AND CORRESPONDING METHODS AND USE

(71) Applicant: HEXCEL REINFORCEMENTS SASU, Dagneux (FR)

(72) Inventors: Andréa Viard, Villemoirieu (FR); Jean-Marc Beraud, Rives (FR); Jean-Benoit Thiel, La chapelle de la tour (FR); François Forestello, Dagneux (FR)

(73) Assignee: HEXCEL REINFORCEMENTS, Dagneux (FR)

( * ) Notice: Subject to any disclaimer, the term of this patent is extended or adjusted under 35 U.S.C. 154(b) by 838 days.

(21) Appl. No.: 17/823,032

(22) PCT Filed: Mar. 11, 2021

(86) PCT No.: PCT/FR2021/050419
§ 371 (c)(1),
(2) Date: Aug. 29, 2022

(87) PCT Pub. No.: WO2021/181050
PCT Pub. Date: Sep. 16, 2021

(65) Prior Publication Data
US 2024/0200236 A1      Jun. 20, 2024

(30) Foreign Application Priority Data
Mar. 11, 2020    (FR) ...................................... 2002411

(51) Int. Cl.
*D02G 3/26*      (2006.01)
*B29C 70/20*     (2006.01)
(Continued)

(52) U.S. Cl.
CPC ............... *D02G 3/26* (2013.01); *B29C 70/20* (2013.01); *B32B 5/12* (2013.01); *B32B 5/265* (2021.05);
(Continued)

(58) Field of Classification Search
CPC ..... B32B 11/16; B32B 2262/16; B32B 5/266; B32B 5/02; B32B 5/12; B32B 5/022;
(Continued)

(56) References Cited

U.S. PATENT DOCUMENTS 6,503,856 B1    1/2003  Anderson et al.
6,828,016 B2    12/2004 Kazutami et al.
(Continued)

FOREIGN PATENT DOCUMENTS

EP      1469113 B1    8/2007
EP      1125728 B1    10/2011
(Continued)

OTHER PUBLICATIONS

International Search Report (ISR) for International Application No. PCT/FR2018/052925, mailed on Feb. 19, 2019.

*Primary Examiner* — Camie S Thompson
(74) *Attorney, Agent, or Firm* — W. Mark Bielawski

(57)      ABSTRACT
The invention relates to a reinforcing material (1) consisting of a unidirectional reinforcing web (2) formed of one or more carbon reinforcing yarns (3), associated on each of its faces with a veil of polymeric fibers (4, 5) chosen from among nonwoven materials, the polymeric portion of the reinforcing material representing from 0.5% to 10% of the total weight of the reinforcing material (1), and preferably from 2% to 6% of its total weight, said unidirectional reinforcing web (2) comprising one or a series of reinforcing yarns (3) individually twisted having a twist of 3 turns/m to 15 turns/m, preferably from 6 turns/m to 12 turns/m.

12 Claims, 12 Drawing Sheets

(51) Int. Cl.

| | |
|---|---|
| *B29K 105/10* | (2006.01) |
| *B29K 307/04* | (2006.01) |
| *B32B 5/12* | (2006.01) |
| *B32B 5/26* | (2006.01) |
| *D04H 3/002* | (2012.01) |
| *D04H 3/04* | (2012.01) |

(52) U.S. Cl.
CPC ............... *D04H 3/002* (2013.01); *D04H 3/04* (2013.01); *B29K 2105/105* (2013.01); *B29K 2307/04* (2013.01); *B29K 2995/0097* (2013.01); *B32B 2250/03* (2013.01); *B32B 2250/20* (2013.01); *B32B 2262/106* (2013.01); *B32B 2262/16* (2021.05); *B32B 2307/718* (2013.01); *B32B 2307/7376* (2023.05); *D10B 2101/12* (2013.01); *D10B 2505/02* (2013.01)

(58) Field of Classification Search
CPC ........ B32B 2307/7376; B32B 2307/04; B32B 2307/726; B32B 2307/718; B32B 2307/202; B32B 2307/54; B32B 2250/03; B32B 2250/05; B32B 2250/40; B32B 2250/20; B32B 2260/023; B32B 2260/046; B32B 2262/0261; B32B 2262/106; B32B 2605/18; Y02T 50/40; D10B 2101/12; D04H 3/002; D04H 3/04; D02G 3/26; B29C 70/14; B29C 70/20; B29K 2105/105; B29K 2995/0097
See application file for complete search history.

(56) References Cited

U.S. PATENT DOCUMENTS

| | | | |
|---|---|---|---|
| 8,696,850 B2 | 4/2014 | Beraud et al. | |
| 9,295,603 B1 | 3/2016 | Selnow | |
| 9,427,917 B2 | 8/2016 | Beraud et al. | |
| 9,702,065 B2 | 7/2017 | Beraud et al. | |
| 10,576,697 B2 | 3/2020 | Beraud et al. | |
| 2015/0204000 A1* | 7/2015 | Bergstrom ........... | B29C 70/226 |
| | | | 442/352 |

FOREIGN PATENT DOCUMENTS

| | | | |
|---|---|---|---|
| EP | 2547816 B1 | 7/2016 | |
| EP | 2376276 B1 | 11/2016 | |
| EP | 2794221 B1 | 4/2018 | |
| EP | 2841341 B1 | 8/2020 | |
| WO | 00/58083 A1 | 10/2000 | |
| WO | 2006/092514 A2 | 9/2006 | |
| WO | 2006/121961 A1 | 11/2006 | |
| WO | 2007/015706 A1 | 2/2007 | |
| WO | 2008/155504 A2 | 12/2008 | |
| WO | 2010/061114 A1 | 6/2010 | |
| WO | 2011/086266 A1 | 7/2011 | |
| WO | 2012/010805 A1 | 1/2012 | |
| WO | 2013/13347 A1 | 9/2013 | |
| WO | 2013/133437 A1 | 9/2013 | |
| WO | 2014/191667 A1 | 12/2014 | |
| WO | 2019/102136 A1 | 5/2019 | |

* cited by examiner

[Fig.1A]
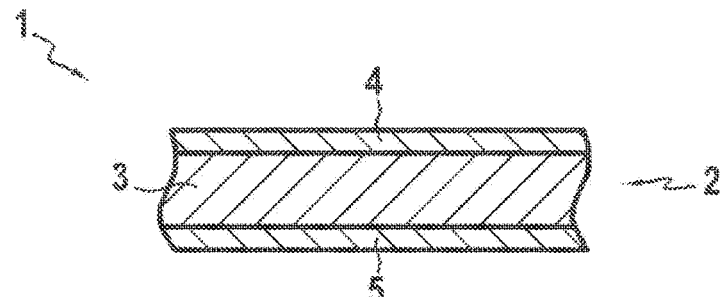
[Fig.1B]
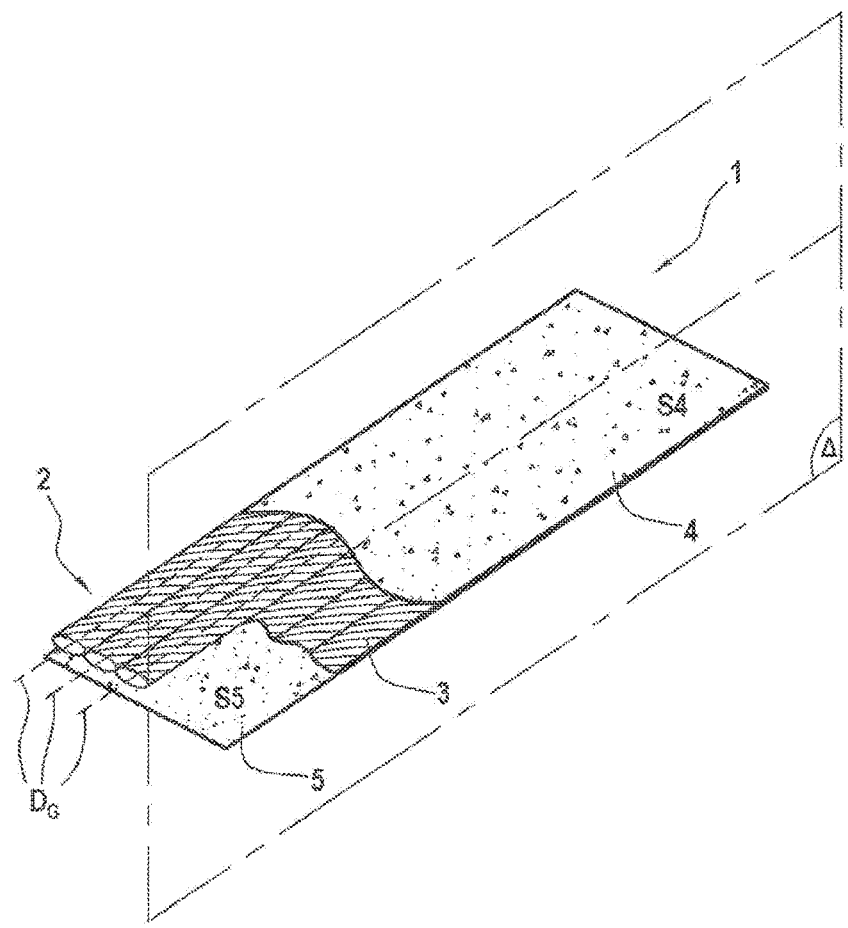

[Fig.1C]
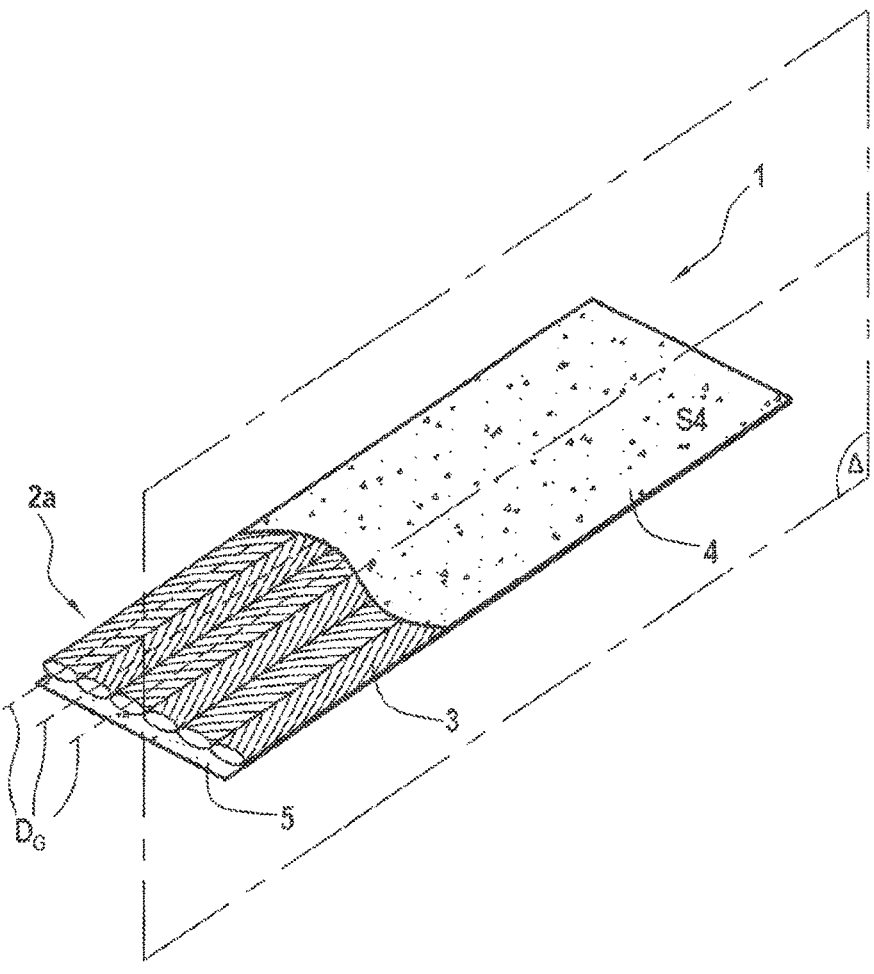
[Fig.2]
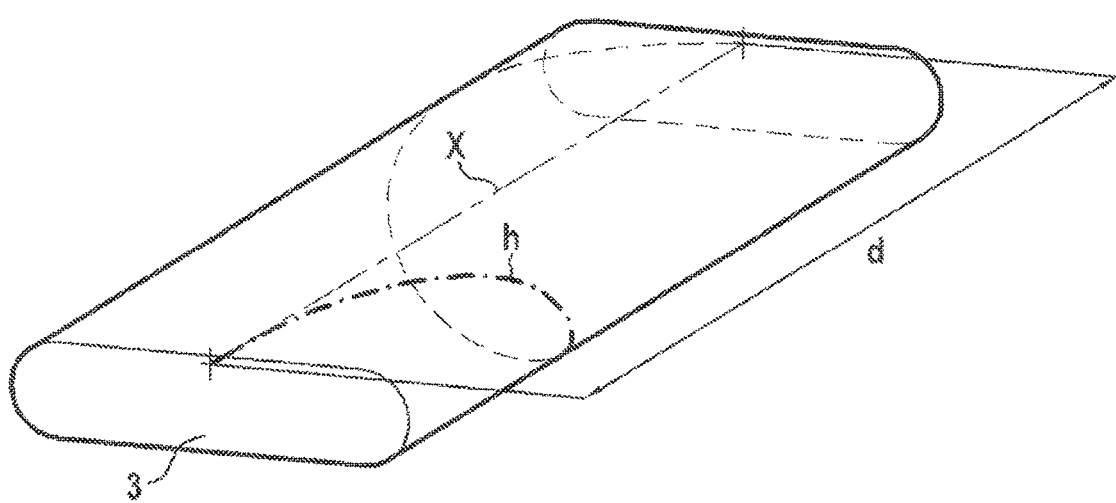

[Fig.3]
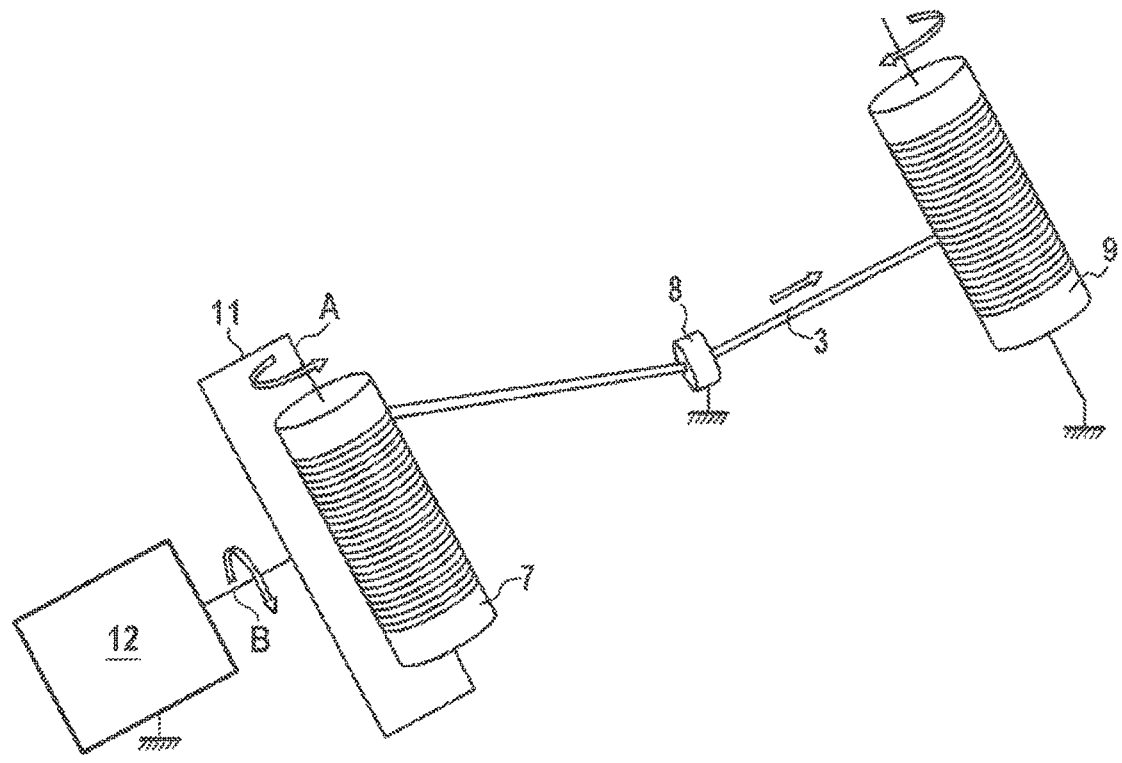
[Fig.4]
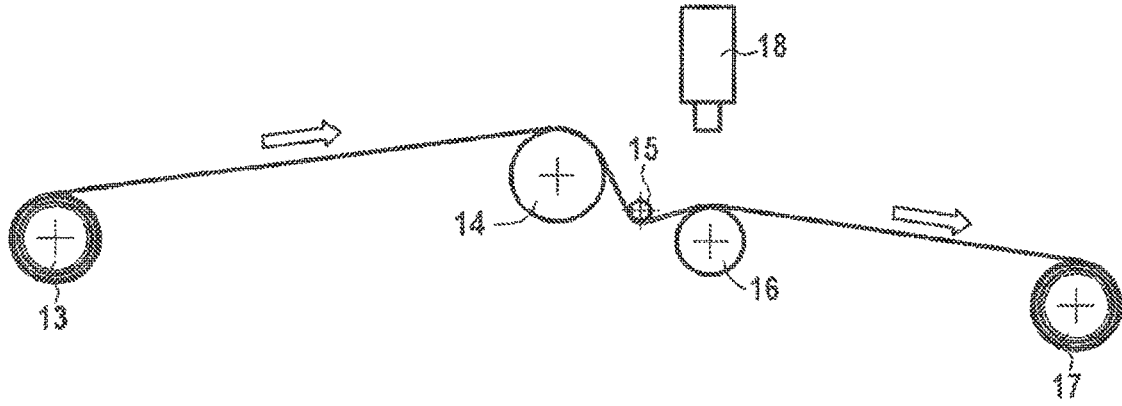

[Fig.5]
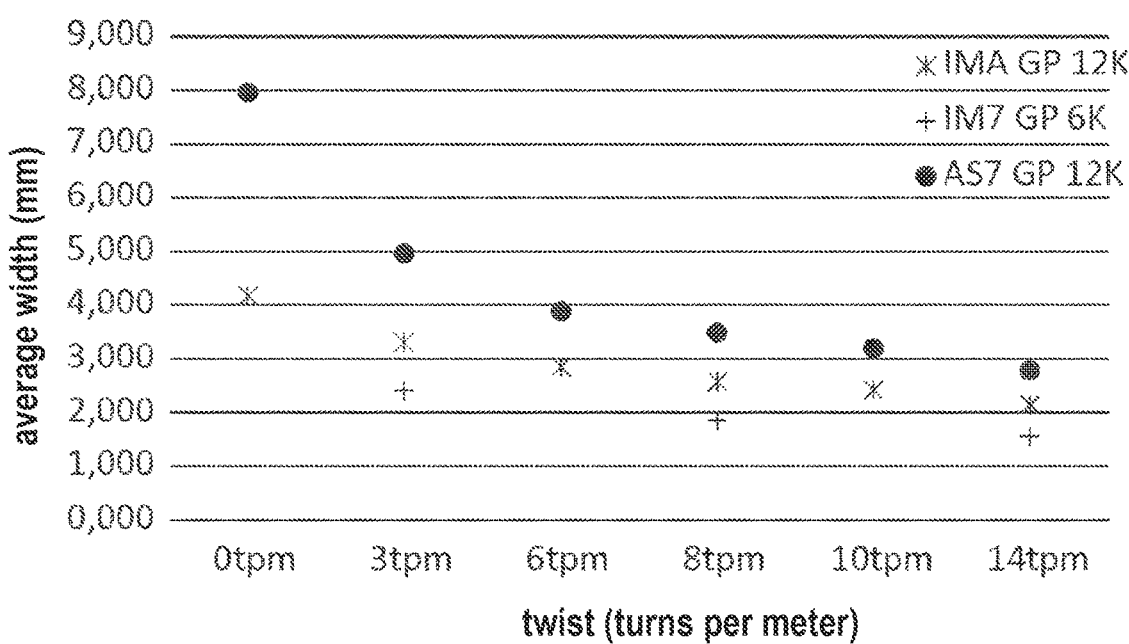
[Fig.6]
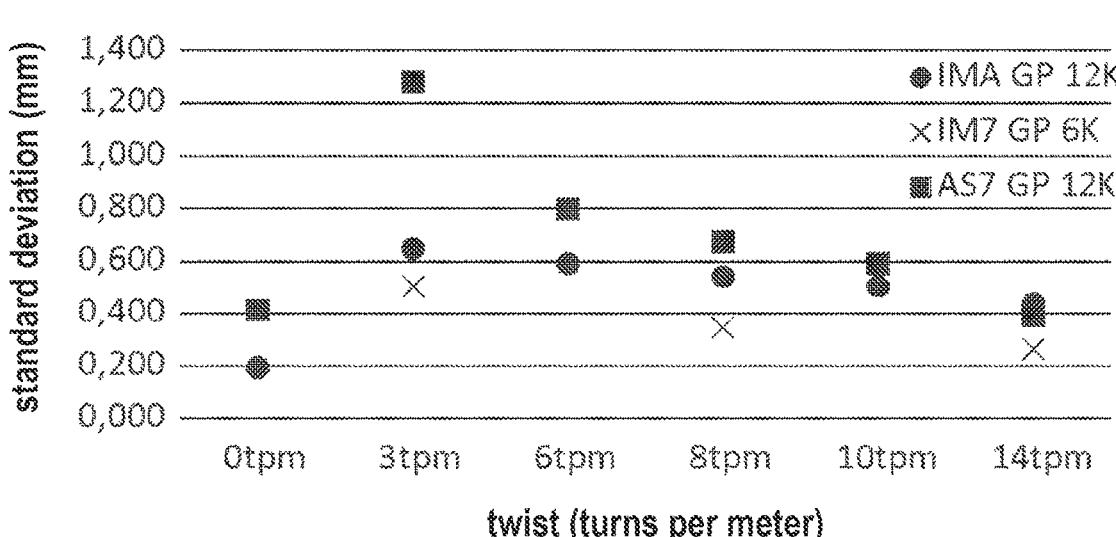

[Fig.7]
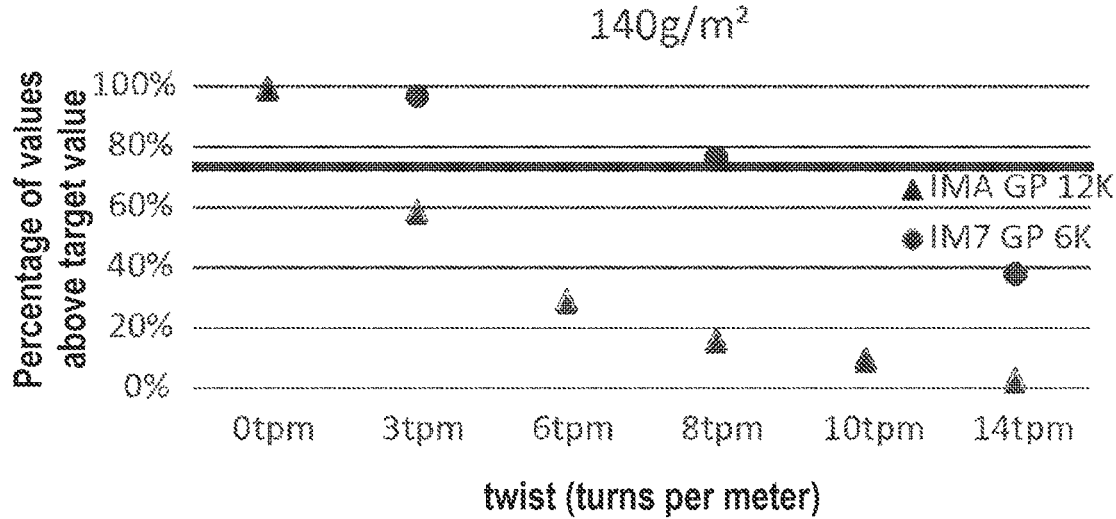
[Fig.8]
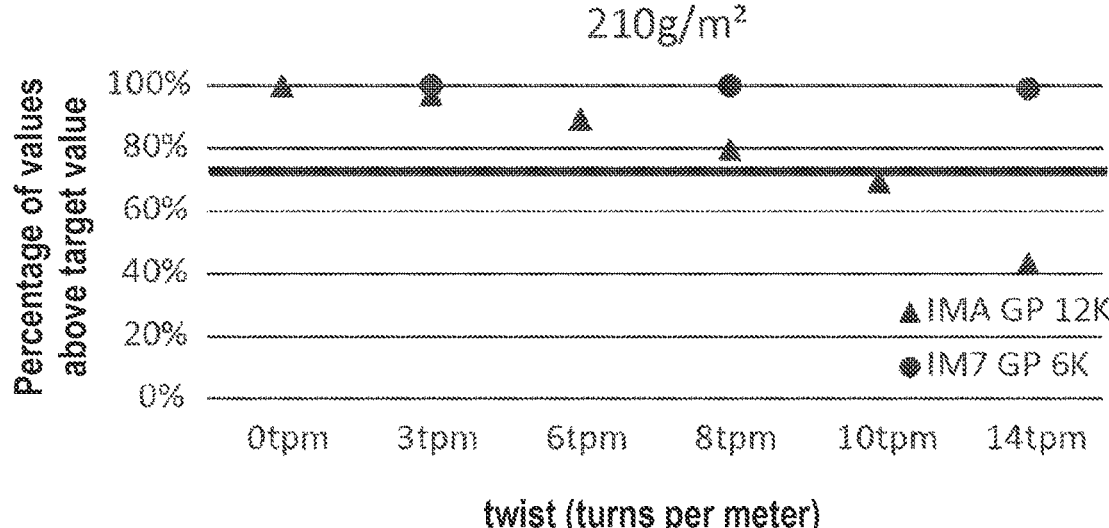

[Fig.9]
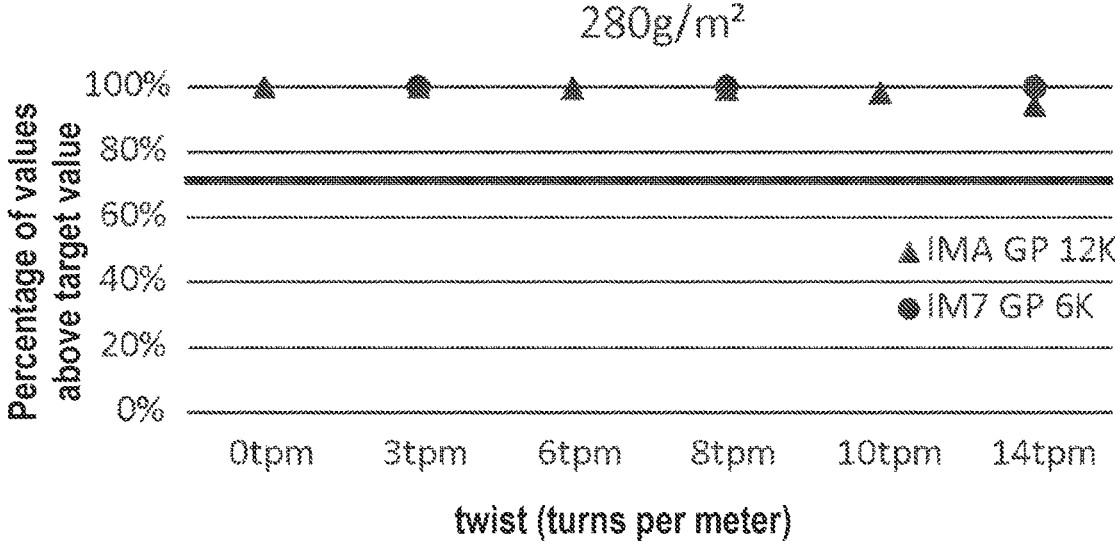
[Fig.10]
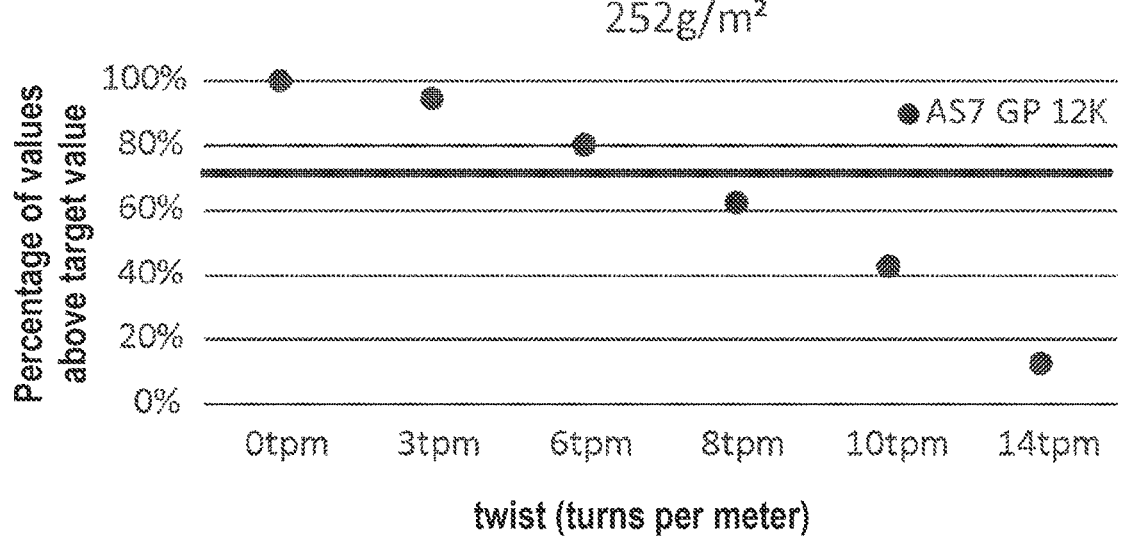

[Fig.11]
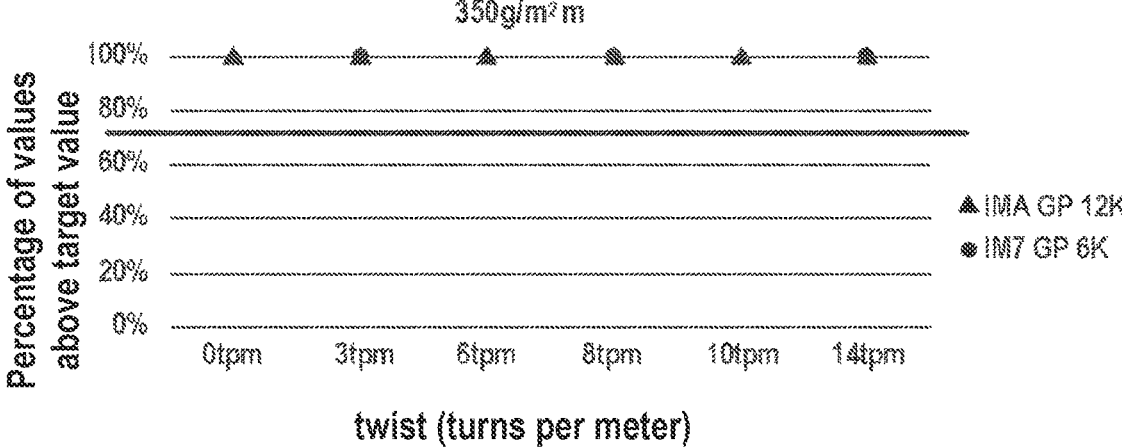
[Fig.12]
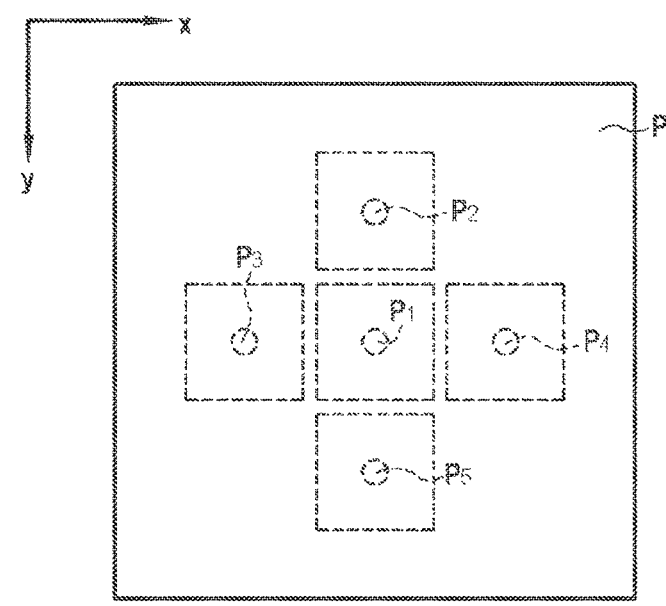

[Fig.13]
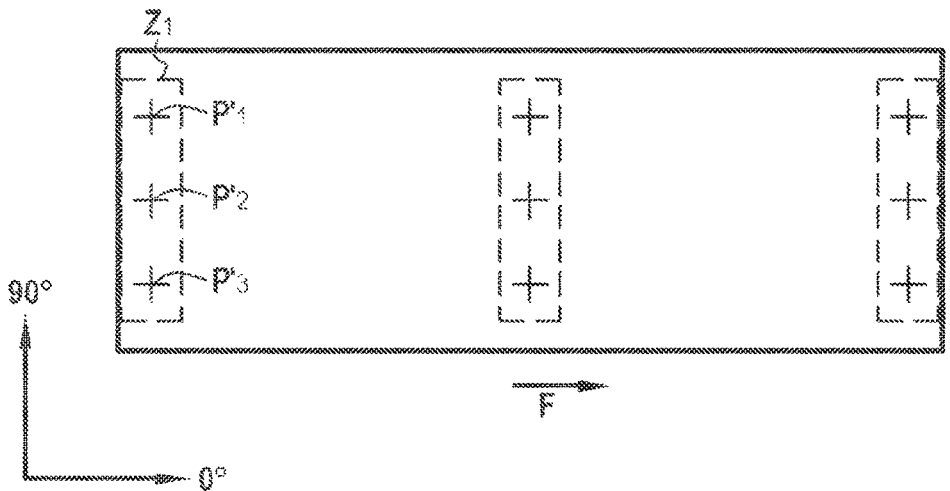
[Fig.14]
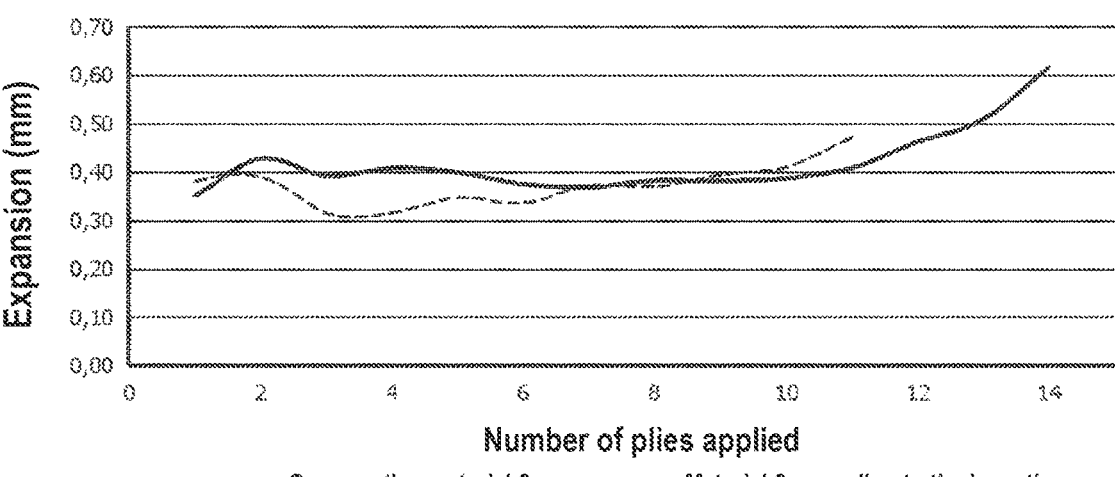

[Fig.15]
[Fig.16]
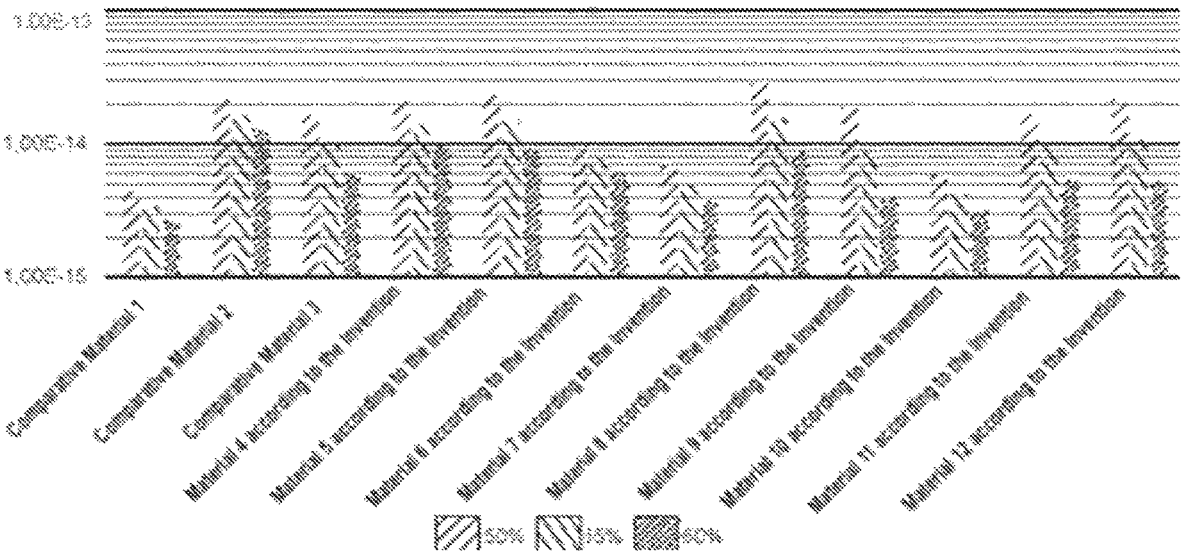

[Fig.17]
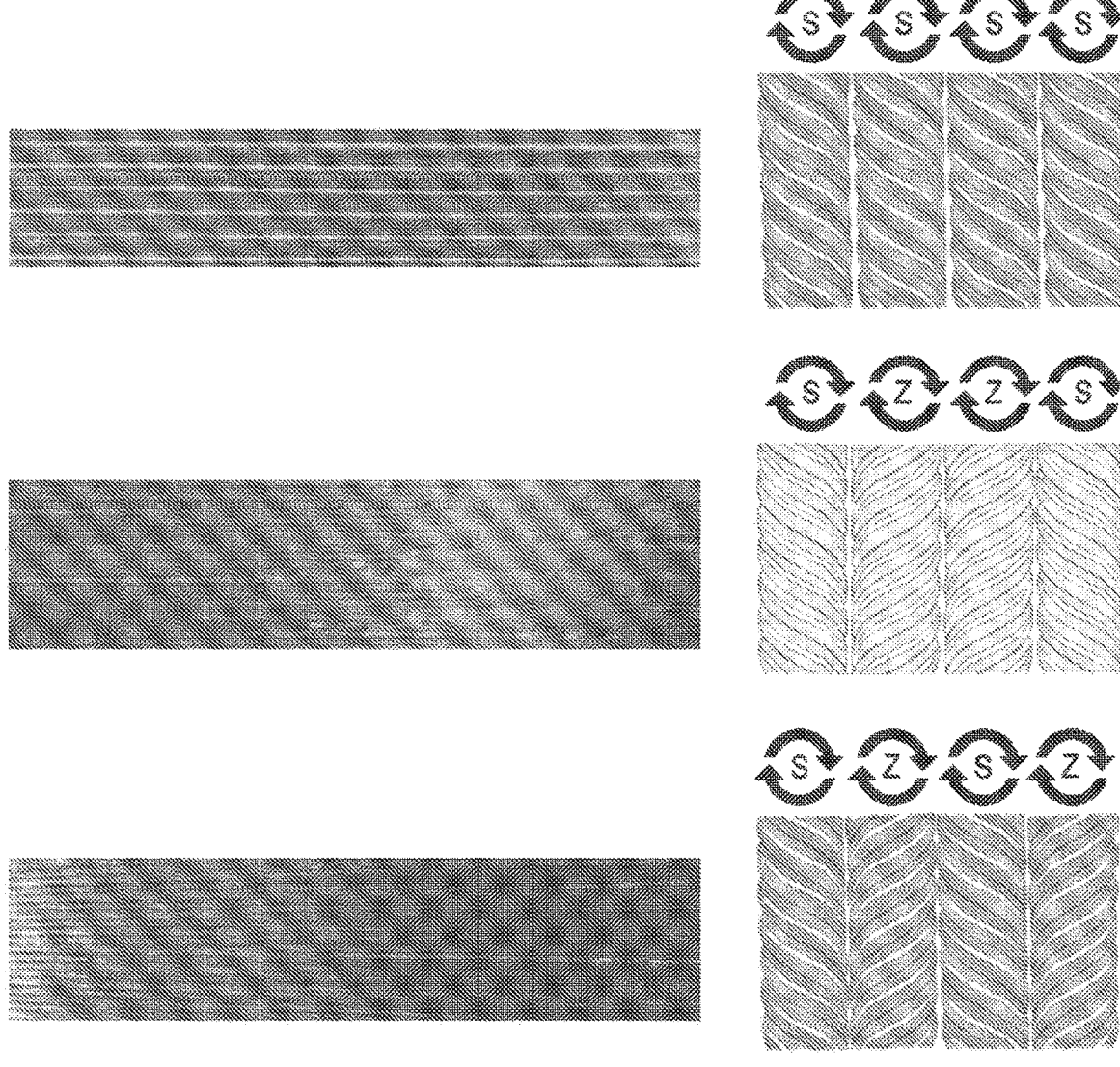

[Fig.18]
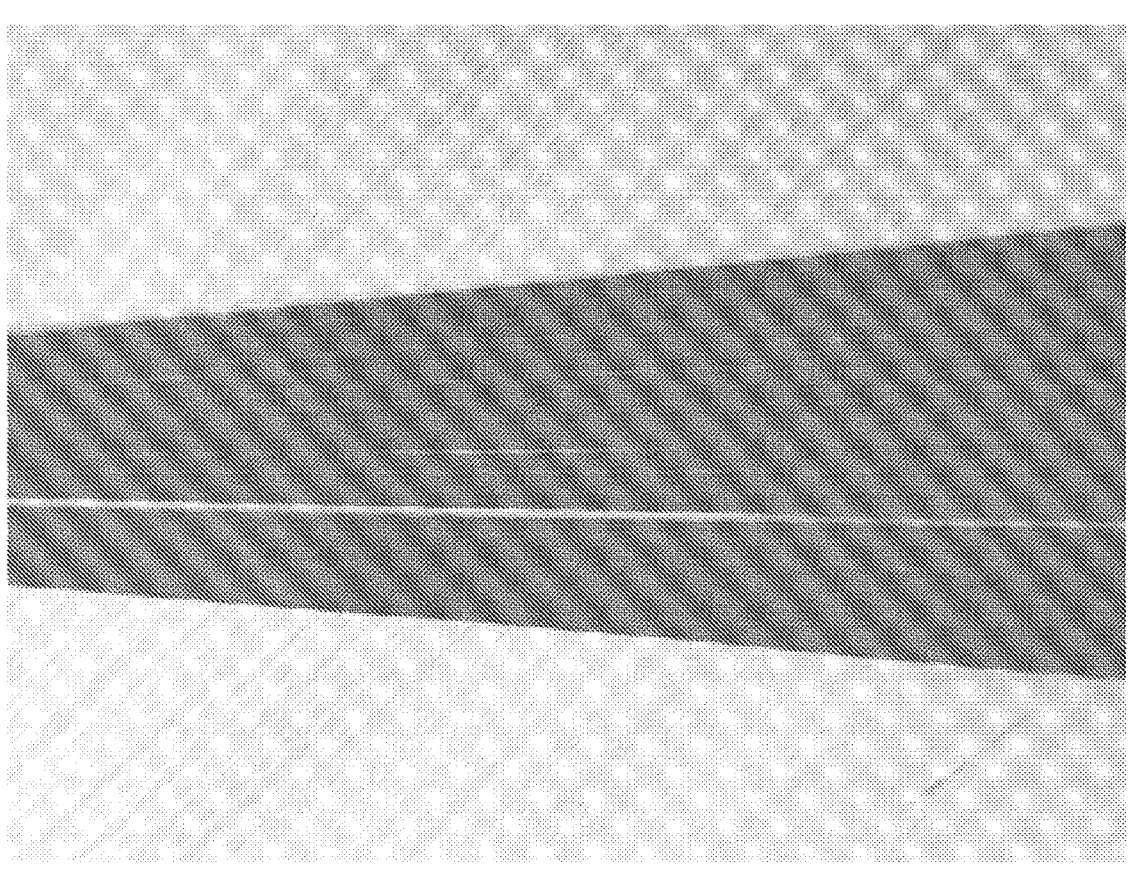

[Fig.19]
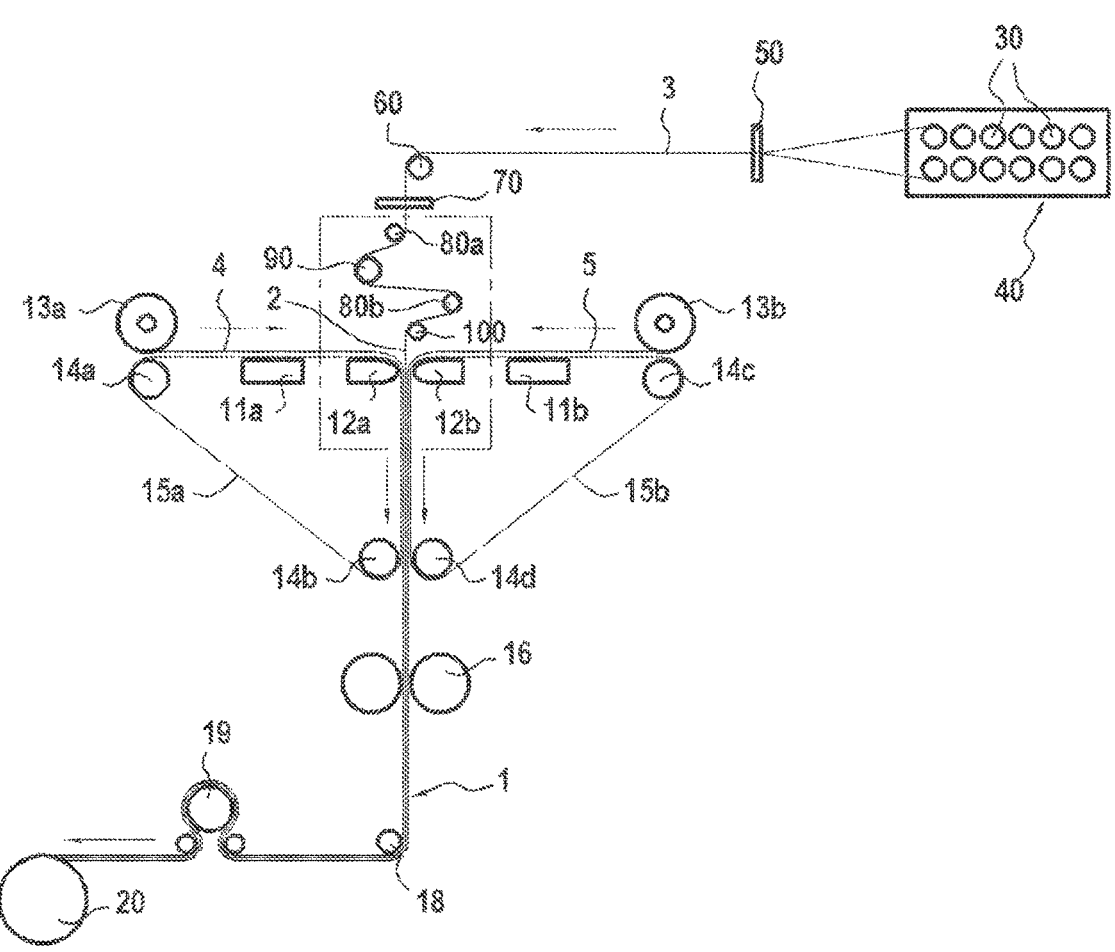

REINFORCING MATERIAL COMPRISING TWISTED CARBON THREADS FOR THE MANUFACTURE OF COMPOSITE PARTS, AND CORRESPONDING METHODS AND USE

TECHNICAL FIELD

The present invention relates to the technical field of reinforcing materials, suitable for forming composite parts. More specifically, the invention relates to materials, suitable for making composite parts in association with an injected or infused resin, comprising a unidirectional web made at least in part with one or more individually twisted reinforcing yarns, having a twist suitable for ensuring the diffusion of the injected or infused resin during production of the composite part.

PRIOR ART

The manufacture of composite parts or articles, that is, comprising, firstly, one or more fibrous reinforcements, in particular of the unidirectional fibrous web type, and, secondly, a matrix (which is, usually, mainly of the thermosetting type and can include one or more thermoplastics) can, for example, be produced by a so-called direct or LCM (Liquid Composite Molding) process. A direct process is defined by the fact that one or more fibrous reinforcements are used in the "dry" state (that is, without the final matrix), the resin or matrix being implemented separately, for example, by injection into the mold containing the fibrous reinforcements (Resin Transfer Molding (RTM) process), by infusion through the thickness of the fibrous reinforcements (Liquid Resin Infusion (LRI) process, or Resin Film Infusion (RFI) process), or else by manual coating/impregnation by means of a roller or a brush, on each of the individual layers of fibrous reinforcements, applied successively to the form. Within the scope of manufacturing composite parts, particularly in the aerospace field, the mass production rate can be high. For example, for the manufacture of single-aisle aircraft, aerospace customers want to be able to produce several dozen aircraft per month. Direct processes such as infusion or injection are particularly relevant processes that can meet this requirement.

For RTM, LRI, or RFI processes, it is generally necessary to first make a fibrous preform or stack in the shape of the desired finished article, and then impregnate that preform or stack with a resin to form the matrix. The resin is injected or infused by means of a temperature pressure differential, then after all the required amount of resin is contained in the preform, the assembly is brought to a higher temperature to perform the polymerization/cross-linking cycle and thus cause it to harden.

Composite parts used in the automotive, aerospace or naval industries in particular are subject to very stringent requirements, particularly in terms of mechanical properties. In order to save fuel and facilitate the maintenance of parts, the aerospace industry has replaced many metallic materials with lighter composite materials.

The resin which is subsequently associated, in particular by injection or infusion, with the fibrous reinforcements, during the production of the part, may be a thermosetting resin, for example of the epoxy type. In order to make it possible for resin to flow correctly through a preform made from a stack of various layers of fibrous reinforcements, this resin is, usually, very fluid, for example with a viscosity on the order of 50 mPa·s. to 200 mPa·s, or even lower, at the infusion/injection temperature. The major disadvantage of this type of resin is brittleness, after polymerization/cross-linking, which results in low impact resistance of the composite parts produced.

In order to solve this problem, it has been proposed in documents of the prior art, that fibrous reinforcing layers, in particular unidirectional webs of reinforcing yarns, be associated with porous thermoplastic polymer veils, and in particular with a thermoplastic fiber nonwoven material (also referred to as a ply). Such solutions are notably described in patent applications or patents EP 1125728, U.S. Pat. No. 6,828,016, WO 00/58083, WO 2007/015706, WO 2006/121961, U.S. Pat. No. 6,503,856, US 2008/7435693, WO 2010/046609, WO 2010/061114 and EP 2 547816, US 2008/0289743, US 2007/8361262, US 2011/9371604, WO 2011/048340. The addition of this porous thermoplastic layer, in particular of the nonwoven type, makes it possible to improve the mechanical properties of the composite parts obtained, in the Compression After Impact (CAI) test, a test commonly used to characterize the impact resistance of structures. The use of nonwoven materials makes it possible, in particular, to achieve mechanical performances adapted to the aerospace field.

In order to achieve satisfactory production rates for composite parts, the times for applying the dry reinforcing materials and impregnating or infusing the resin into the resulting stack or preform of dry reinforcing materials should be as short as possible.

In addition, in the field of aeronautics, stresses linked to the electrical environment of the aircraft in flight and on the ground, particularly in the event of lightning, make it necessary to provide a material that meets the high level of criteria in this field.

To this end, solutions have been proposed in the prior art to:

increase the permeability of dry reinforcing materials to the liquid resin that is injected or infused;

provide satisfactory transverse electrical conductivity.

The applicant has proposed micro-perforations of the previously described materials, which improve the transverse permeability of the material (WO 2010/046609), improve its transverse cohesion and thus facilitate its processing by automated application (WO 2014/076433), improve the transverse electrical conductivity of the composite parts produced (WO 2013/160604).

Nevertheless, from an industrial point of view, this technique requires special tooling to make the micro-perforations and results in a complex application operation for micro-perforated materials, especially for those with high grammages.

In addition, application WO 2008/155504 in the name of the applicant, describes a method for the manufacture of a composite material in which at least one twisted yarn is applied to an application surface, and having a trajectory having at least one curved zone on the application surface and in which the reinforcing yarn is bonded to the application surface by means of a polymer binder. The method is used to produce preforms or complex-shaped parts where the application of a yarn on a curved zone is necessary and proposes to apply to the yarn upstream of its application a twist chosen to at least compensate for the differences in length presented by the extreme paths of the yarn on either side of its width measured parallel to the application surface.

WO 2013/133437 describes a very specific material made from carbon yarns comprising 50,000 to 60,000 filaments that are twisted having a twist of 5 turns/m to 50 turns/m and arranged in the same direction, so as not to overlap, to provide a carbon sheet with a basis weight greater than 800 g/m and less than or equal to 26,000 g/m, suitable for an RTM process. The proposed materials are intended for the design of wind turbine blades, vehicles or boats, but are not suitable for the aerospace field.

The object of the present invention is therefore to propose an alternative solution to known prior art techniques adapted to the field of aeronautics, by aiming to provide new reinforcing materials for the production of composite parts in association with an injected or infused resin, these new reinforcing materials which, while retaining high transverse permeability, have improved application properties, reduced overrun after application, and improved transverse electrical conductivity.

Presentation of the Invention

In this context, the present invention relates to a reinforcing material consisting of a unidirectional reinforcing web formed of one or more carbon reinforcing yarns, associated on each of its faces with a layer of polymeric fibers selected from among nonwoven materials, the polymeric part of the reinforcing material representing from 0.5% to 10% of its total weight, and preferably from 2% to 6% of its total weight, said unidirectional reinforcing web comprising one or a series of individually twisted carbon reinforcing yarns having a twist of 3 turns/m to 15 turns/m, preferably of 6 turns/m to 12 turns/m.

According to some embodiments, the unidirectional reinforcing web is formed of a plurality of carbon reinforcing yarns, and at least every fifth reinforcing yarn, preferably at least every second or third reinforcing yarn, and preferably all reinforcing yarns, are individually twisted having a twist of 3 turns/m to 15 turns/m, preferably 6 turns/m to 12 turns/m.

In particular, the unidirectional reinforcing web has a grammage within the range from 126 g/m$^2$ to 280 g/m$^2$, preferably within the range from 126 g/m$^2$ to 210 g/m$^2$ or 210 g/m$^2$ to 280 g/m$^2$.

Within the scope of the invention, the layers of polymeric fibers are thermoplastic in nature and, in particular, consist of a thermoplastic polymer, a partially crosslinked thermoplastic polymer, a mixture of such polymers, or a mixture of thermoplastic and thermosetting polymers.

The polymeric fiber layers have hot tack. Also, their association with the unidirectional reinforcing web is achieved by means of this hot tack.

Advantageously, the layers of polymeric fibers are identical nonwoven materials.

Typically, said nonwoven materials have a basis weight within the range from 0.2 g/m$^2$ to 20 g/m$^2$ and/or a thickness of 0.5 microns to 50 microns, preferably 3 microns to 35 microns.

The reinforcing material according to the invention has, advantageously, the feature of being neither perforated, nor sewn, nor knitted, nor woven.

Within the scope of the invention, the use of carbon reinforcing yarns that have previously undergone a twisting operation, so as to have within the reinforcing material according to the invention, a series of reinforcing yarns having a twist of 3 t/m to 15 t/m, makes it possible:

to obtain a bond between the upper and lower faces of the unidirectional web, increasing transverse cohesion;

to create between the two faces of the unidirectional web, by means of the twisted reinforcing yarns, diffusion continuity for the resin that will be injected or infused during the production of the composite part. The continuity of the filaments of the twisted reinforcing yarns that join the two faces of the unidirectional web contributes to transverse permeability. In addition, the twisted reinforcing yarns are able to create channels extending along the filaments of the twisted reinforcing yarns that join the two faces of the unidirectional web. Thus, transverse permeability is obtained by means of a multitude of permeabilities extending at the level of the twisted reinforcing yarns, following the filaments which extend from one face to the other of the unidirectional sheet;

to create by means of the carbon reinforcing yarns which are electrical conductors, a continuity of the electrical conductivity along the filaments of the twisted reinforcing yarns which join the two faces of the unidirectional sheet.

The invention relates to reinforcing materials for the production of composite parts, by means of a direct process. That is, in order to produce composite parts, the reinforcing materials according to the invention should be associated with a polymeric resin that will be injected or infused within said reinforcing material or a stack of such reinforcing materials. Also, conventionally, the weight of the polymeric part of the reinforcing material according to the invention represents at most 10% of the total weight of the reinforcing material according to the invention. Typically, the polymeric portion of the reinforcing material represents from 0.5% to 10% of the total weight of the reinforcing material, and preferably from 2% to 6% of its total weight. This polymeric portion corresponds to the total portion of polymer(s) present within the reinforcing material according to the invention: it therefore includes, or even consists of, the nonwoven materials present within the reinforcing material according to the invention. The advantages of the invention are obtained without the need to increase the polymeric part of the material, that is, the amount of polymeric material present, in the layers of polymeric fibers formed of a nonwoven material, present on both sides of the unidirectional web.

With the exception of the use of twisted reinforcing yarns, the polymeric fiber layers of the reinforcing materials correspond to those described in the prior art, and in particular in WO 2010/046609, prior to the micro-perforation step.

When a unidirectional reinforcing web is formed of an assembly of carbon reinforcing yarns, the carbon reinforcing yarns are located side by side. The twisted reinforcing yarns may be arranged next to each other where a non-twisted reinforcing yarn or yarns may also be interposed between two consecutive twisted reinforcing yarns. After the unidirectional web has been formed, it can be associated, in particular by lamination on each of its faces, with a layer of polymeric fibers chosen from among nonwoven materials.

According to an alternate embodiment using a unidirectional reinforcing web, referred to as mixed S/Z, the reinforcing materials are characterized by the fact that all the carbon reinforcing yarns forming the unidirectional reinforcing web are individually twisted having a twist of 3 turns/m to 15 turns/m, preferably 6 turns/m to 12 turns/m, the unidirectional reinforcing web comprising at least 3 carbon reinforcing yarns thus twisted with at least one twisted carbon reinforcing S-twist yarn and at least one twisted carbon reinforcing Z-twist yarn, and:

when the total number of twisted carbon reinforcing yarns forming the unidirectional reinforcing web (referred to as total number of yarns) is even, the number of twisted carbon reinforcing S-twist yarns on one side of the plane Δ and the number of twisted carbon reinforcing S-twist yarns on the other side of the plane Δ are each independently an integer in the range {[(total number of yarns)/4]−35%; [(total number of yarns)/4]+35%}, each endpoint of the range being rounded to the nearest integer if the formula defining it results in an integer, the other twisted carbon reinforcing yarns being Z-twist yarns;

when the total number of twisted carbon reinforcing yarns forming the unidirectional reinforcing yarn (named total number of yarns) is odd, the number of twisted carbon reinforcing S-twist yarns on one side of the plane Δ and the number of twisted carbon reinforcing S-twist yarns on the other side of the plane Δ are either two integers or two and a half integers, and are each independently in the range {[(total number of yarns)/4]−35%; [(total number of yarns)/4]+35%}, each endpoint of the range being rounded to the nearest integer or integer and a half if the formula defining it results in an integer or integer and a half, the remaining twisted carbon reinforcing yarns being Z-twist yarns;

the plane Δ being the plane parallel to the general direction of extension of said unidirectional web and which divides said unidirectional web into two equal parts, being perpendicular to its surface.

In other words, the number of twisted carbon reinforcing yarns forming the unidirectional reinforcing web (referred to as "total number of yarns" in the definition of the ranges of unidirectional so-called mixed S/Z webs for the sake of simplicity) is equal on both sides of the plane Δ, which is at the level of the neutral fiber of the unidirectional reinforcing web. Thus, if a unidirectional reinforcing web consists of n (n being an integer greater than 3 in the case of a unidirectional reinforcing web, referred to as mixed S/Z) twisted carbon reinforcing yarns, there are n/2 twisted carbon reinforcing yarns on either side of the plane Δ.

Further, a mixed S/Z unidirectional reinforcing web comprising an integer m of twisted carbon reinforcing S-twist yarns, the sum of the number m1 of twisted carbon reinforcing S-twist yarns lying on one side of the plane Δ and the number m2 of twisted carbon reinforcing S-twist yarns lying on the other side of the plane Δ is an integer. Similarly, a unidirectional reinforcing web comprising an integer p of twisted carbon reinforcing Z-twist yarns, the sum of the number p1 of twisted carbon reinforcing Z-twist yarns lying on one side of the plane Δ and the number p2 of twisted carbon reinforcing Z-twist yarns Z lying on the other side of the plane Δ is an integer. Thus, for example, in the case of a unidirectional reinforcing web formed of a sequence of twisted carbon reinforcing SZSZSZS yarns (twist of yarns laid side by side) satisfying definition I1, the number of yarns n/2 on either side of the plane Δ is 3.5, m1=m2=2 and p1=p2=1.5.

In particular, such materials according to the invention comprising a unidirectional reinforcing web, referred to as a mixed S/Z web, have the advantage that they can be produced over long lengths and at high speed. In such embodiments with a unidirectional, so-called mixed S/Z reinforcing web, the material according to the invention advantageously has a width of more than 7 mm, preferably more than 12 mm, and preferably within the range from 12 mm to 51 mm, and preferably a length of 2 m to 5000 m, preferably 100 m to 2000 m.

According to another aspect, the invention relates to a process for preparing a reinforcing material comprising the following successive steps:

a1) providing a unidirectional reinforcing web formed of one or more reinforcing yarns individually twisted having a twist of 3 turns/m to 15 turns/m, a2) providing at least two layers of polymeric fibers selected from nonwoven materials, a3) associating each of the layers of polymeric fibers with each of the faces of the unidirectional reinforcing web.

For example, the preparation process comprises, upstream of step a1), a step of making the unidirectional reinforcing web comprising applying a twist of 3 turns/m to 15 turns/m to a reinforcing yarn or series of yarns, said twist being applied individually to each yarn.

According to one embodiment, the unidirectional reinforcing web is formed of a plurality of reinforcing yarns and the preparation process comprises, upstream of step a1):

i) applying a twist of 3 turns/m to 15 turns/m to a series of reinforcing yarns, said twist being applied to each yarn individually, ii) aligning the twisted yarns thereby obtained, potentially with other reinforcing yarns, and arranging said yarns side by side, so as to form a unidirectional reinforcing web.

In such a process, the layers of polymeric fibers have hot tack properties and the association of step a3) is advantageously obtained by applying each of the layers of polymeric fibers to each of the faces of the unidirectional reinforcing web, said application being accompanied or followed by heating the polymeric fibers, causing them to soften or melt, which is then followed by cooling.

The invention also has as its object a preform consisting, at least in part, of one or more reinforcing materials according to the invention.

Another object of the invention relates to a method for the manufacture of a composite part from at least one reinforcing material according to the invention. According to this manufacturing method, a thermosetting resin, thermoplastic resin or a mixture of thermosetting and thermoplastic resins is injected or infused within said reinforcing material, a stack of several reinforcing materials according to the invention, or a preform according to the invention.

In particular, such a method comprises, prior to the infusion or injection of the resin, a step of forming a ply or a stack comprising several reinforcing materials according to the invention, during which said reinforcing material is conveyed and circulates, continuously, within a guiding member, in order to ensure its positioning, during its application leading to the desired ply or stack. Conventionally, the material according to the invention is cut to the desired dimension, in particular to the desired length, for the formation of the fold or stack to be produced.

Advantageously, this method for the manufacture of a composite part comprises, prior to the infusion or injection of the resin, an application or shaping, which preferably utilizes the hot tack properties of the polymeric fiber layers present in the reinforcing material(s).

Another object of the invention relates to the use of one or more reinforcing materials according to the invention for the production of a preform or a composite part in association with a thermosetting or thermoplastic resin or a mixture of thermosetting and thermoplastic resins.

Advantageously, a thermosetting resin, and in particular an epoxy resin, is injected or infused for the implementation of the manufacturing method or the use of the reinforcing material according to the invention.

The invention will be better understood from the following detailed description, with reference to the attached figures.

BRIEF DESCRIPTION OF THE DRAWINGS

FIG. 1A is a partial schematic cross-sectional view of a reinforcing material according to the invention.

FIG. 1B is a schematic perspective view, partially cut away, showing a reinforcing material according to the invention having a unidirectional web formed of a series of twisted yarns.

FIG. 1C is a schematic, partially cut-away perspective view showing a reinforcing material according to the invention having a unidirectional web is formed of a series of twisted reinforcing yarns 3 in an SZSZSZ configuration, reading the Figure from right to left, that is, an S-twist yarn is laid down next to a Z-twist yarn, which is in turn laid down next to an S-twist yarn, and so on.

FIG. 2 is a schematic view depicting the twist on a twisted reinforcing yarn according to the invention.

FIG. 3 is a schematic view explaining the principle of a twisting machine used for applying a twist to reinforcing yarns.

FIG. 4 is a schematic view of a station adapted to measure the width of reinforcing yarns, especially twisted yarns.

FIG. 5 is a graph showing the average width of the reinforcing yarns (mm) as a function of twist (tpm), for various reinforcing yarns.

FIG. 6 is a graph showing the standard deviation of the average widths (mm) of the reinforcing yarns as a function of twist, for various reinforcing yarns.

FIG. 7 is a graph showing, for a weight of 140 g/m2, the percentages of values above the target value for the width of the reinforcing yarns, as a function of the twist of various reinforcing yarns.

FIG. 8 is a graph showing, for a grammage of 210 g/m2, the percentages of values above the target value for the width of the reinforcing yarns, as a function of the twist of various reinforcing yarns.

FIG. 9 is a graph showing, for a grammage of 280 $g/m^2$, the percentages of values above the target value for the width of the reinforcing yarns, as a function of the twist of the various reinforcing yarns.

FIG. 10 is a graph showing, for a grammage of 252 $g/m^2$, the percentages of values above the target value for the width of the reinforcing yarns, as a function of the twist of various reinforcing yarns.

FIG. 11 is a graph showing, for a grammage of 350 $g/m^2$, the percentages of values above the target value for the width of the reinforcing yarns, as a function of the twist of the various reinforcing yarns.

FIG. 12 is a diagram illustrating the position of measurement points on a preform.

FIG. 13 is a schematic diagram illustrating the principle of measuring the thickness of a reinforcing yarn preform.

FIG. 14 is a graph showing the changes in the overrun as a function of the number of plies applied, for the material 8 according to the invention and the comparative material 3.

FIG. 15 is a graph showing the changes in the overrun as a function of the number of plies applied, for the material 4 according to the invention and the comparative material 3.

FIG. 16 is a plot of transverse permeability ($m^2$) versus fiber volume rate (FVR) for comparative and inventive materials.

FIG. 17 shows the differences observed in the formation of a ply made with reinforcing materials according to the invention, 6.35 mm wide and made of a unidirectional web of carbon yarns, grammage 280 $g/m^2$, made with 4 yarns twisted at 10 turns/m, but having 3 configurations: SSSS, SZZS, and SZSZ. On the right, a partial schematic view of the top of the unidirectional layers, present in each case within the reinforcing materials used, is presented, with a presentation, above each partial schematic view, of the S- or Z-twisting direction of the reinforcing yarns of each unidirectional layer, along the cross-section of said yarns.

FIG. 18 shows the gap obtained at the junction between the 7 S-twist reinforcing yarns and the 5 Z-twist reinforcing yarns twist, when a unidirectional carbon yarn web is produced, grammage 210 $g/m^2$ and 38.1 mm wide, made with an SSSSSSSZZZZZZSSSSSS configuration (7 S-twist yarns, then 5 Z-twist yarns, then 6 S-twist yarns). In fact, during the production of the unidirectional web, the groups of S-twist yarns are driven to the left, while the group of Z-twist yarns is driven to the right, which creates a gap at the junction of 7 S-twist yarns/5 Z-twist yarns.

FIG. 19 is a schematic representation of a production line used in the examples.

DESCRIPTION OF THE METHODS OF IMPLEMENTATION

An object of the invention relates, as illustrated in FIG. 1A, to a reinforcing material 1 consisting of a unidirectional reinforcing web 2 formed of one or more carbon reinforcing yarns 3, associated on each of its faces with a veil corresponding to a layer of polymeric fibers 4, 5 forming a nonwoven material. More precisely, as will be described in detail in the remainder of the description, at least some of the carbon reinforcing yarns 3 are twisted individually.

"Unidirectional reinforcing web" means a web consisting exclusively or almost exclusively of carbon reinforcing yarns arranged parallel to each other.

FIG. 1B shows a unidirectional web 2 made up of several individually twisted carbon reinforcing yarns 3, associated on each of its faces with a veil 4, 5. Each twisted reinforcing yarn 3 has a general direction $D_G$ of extension (which corresponds to the central axis of the yarn) which is rectilinear in the plane of extension of the unidirectional sheet. Each twisted reinforcing yarn 3 has a general direction of extension $D_G$ that extends rectilinearly, parallel to the extension surfaces S4 and S5 of the veils 4, 5, which in FIG. 1B are planes. In a unidirectional web, the general directions of extension $D_G$ of the reinforcing yarns are all parallel to each other or substantially parallel to each other. It is generally accepted by the person skilled in the art that a deflection between certain general directions of extension $D_G$ of two reinforcing yarns less than or equal to 30, preferably less than or equal to 2° and preferably less than or equal to 1° does not modify the unidirectional character of the web. The general direction of extension of the unidirectional web corresponds to the general direction of extension $D_G$ of the reinforcing yarns if these are all parallel to each other or to the average of these general directions of extension, for the rare cases where there is not strict parallelism between all the directions of extension $D_G$ of the reinforcing yarns 3 forming the unidirectional web 2.

In a unidirectional web, the reinforcing yarns are arranged side by side, to ensure optimal coverage of the surface. In particular, it is desirable to avoid local gaps of more than 1 mm, perpendicular to the direction of extension of the unidirectional web, over a length of more than 10 cm (that is, parallel to the direction of extension of the unidirectional web).

Thermoplastic binding yarns may be provided, in particular, of polyamides, copolyamides, polyesters, copolyesters, ester/ether block copolyamides, polyacetals, polyolefins, thermoplastic polyurethanes, or phenoxy types, to facilitate handling, if necessary, of the web before its association with the polymeric fiber veils. These binding yarns usually extend transversely to the carbon yarns. The term "unidirectional web" also includes unidirectional fabrics, in which spaced weft yarns interweave with the carbon yarns that run parallel to each other and form the warp yarns of the unidirectional fabric. Even in these different cases, where such binding, stitching, or weft yarns are present, the carbon yarns parallel to each other account for at least 95% by weight of the web, which is therefore classified as "unidirectional". Nevertheless, according to a particular embodiment of the invention, the unidirectional web does not comprise any weft yarns interweaving the carbon yarns, so as to avoid any corrugation. In particular, the reinforcing material according to the invention does not comprise any perforations, weaving, sewing, or knitting. In the unidirectional web, the carbon reinforcing yarns are preferably not associated with a polymeric binder and are therefore classified as dry, that is, they are not impregnated, coated, or associated with any polymeric binder prior to their association with the polymeric fiber veils 4, 5. The carbon reinforcing yarns are, however, usually characterized by a standard sizing rate of up to 2% of their weight.

A carbon reinforcing yarn (which may be referred to more simply within the scope of the invention as reinforcing yarn or carbon yarn) is generally made up of an assembly of fibers or filaments and generally comprises from 1,000 to 320,000 filaments, advantageously from 12,000 to 24,000 filaments. The reinforcing yarns used within the scope of the invention are made of carbon. In a particularly preferred manner, within the scope of the invention, carbon yarns of 1 K to 24 K are used. The constituent fibers are preferably continuous. The yarns used generally have a substantially circular cross-section (classified as round yarns) or, preferably, a substantially parallelepipedal or elliptical cross-section (classified as flat yarns). These yarns have a certain width and thickness. As examples of loose yarns having no contact with any physical element, a flat carbon yarn having a titer of 200 tex generally has a width of 1 mm to 3 mm, a 12K flat carbon yarn having a titer of 446 tex, a width of 2 mm to 5 mm, a 12K carbon flat yarn having a titer of 800 tex has a width of 3 mm to 7 mm, a 24K carbon flat yarn having a titer of 1600 tex has a width of 5 mm to 12 mm and a 24K carbon flat yarn having a titer of 1040 tex has a width of 5 mm to 10 mm. A flat carbon yarn of 3,000 to 24,000 filaments will therefore usually have a width of 1 mm to 12 mm. Among the carbon yarns, there are High Resistance (HR) yarns having a tensile modulus between 220 GPa and 241 GPa and having a yield strength between 3450 MPa and 4830 MPa, Intermediate Modulus (IM) yarns having a tensile modulus between 290 GPa and 297 GPa and a yield strength between 3450 MPa and 6200 MPa, High Modulus (HM) yarns having a tensile modulus between 345 GPa and 448 GPa and a yield strength between 3450 and 5520 Pa (according to the "ASM Handbook", ISBN 0-87170-703-9, ASM International 2001) In particular, within the scope of the invention, the unidirectional reinforcing web 2 may be formed of one or more carbon reinforcing yarns 3 having a titer of 3 K to 24 K, preferably 6 K to 12 K.

In accordance with the invention, the unidirectional reinforcing web 2 comprises one or a series of carbon reinforcing yarns 3 individually twisted having a twist of 3 turns/m to 15 turns/m, preferably 6 turns/m to 12 turns/m. In accordance with the invention, a carbon reinforcing yarn 3 to which a twist has been applied is used, that is, a relative rotation of the outer edges of the yarn, about its neutral fiber (corresponding to the central axis of the yarn), so that these describe a helical trajectory, that is, the tangent at each point makes a substantially constant angle with a given direction. As shown in FIG. 2, a twisted carbon reinforcing yarn 3 has, at its core, a neutral fiber with a general direction corresponding to the longitudinal direction X (also referred to as the general direction of extension $D_G$) of the reinforcing yarn 3, while the filaments follow a helical path around this general direction. FIG. 2 schematically illustrates the helical shape of a generatrix h of a twisted reinforcing yarn 3 having a twist of one turn over a linear distance d taken along the longitudinal direction X (also referred to as the general direction of extension $D_G$).

Each carbon reinforcing yarn 3 is individually twisted. Such a twist can be obtained, for example, by using a twisting machine such as a machine marketed by Kamitsu Seisakusho Ltd. model UT-1000. FIG. 3 is a diagram illustrating the twisting process implemented by a twisting machine that makes it possible to obtain a twisted reinforcing yarn 3 in accordance with the invention. A spool 7 on which a reinforcing yarn to be twisted is wound is mounted so that it can rotate about its axis A to allow the reinforcing yarn to be unwound, via a yarn guide 8, to a spool 9 for winding up the twisted reinforcing yarn 3. The spool 7 provided with the reinforcing yarn to be twisted is mounted on a support 11 driven in rotation by a motor 12 along an axis B perpendicular to the axis of the spool 7. The twisting of the reinforcing yarn 3 depends on the linear speed of unwinding of the reinforcing yarn as well as the speed of rotation of the support 11 of the spool 7.

It should be understood that twisting results in change in the width of the twisted reinforcing yarns.

The following description describes the effect of the twisting process on the widths of the twisted reinforcing yarn.

FIG. 4 depicts a method for measuring the width of reinforcing yarns before and after the twisting operation as explained above is performed. The reinforcing yarn having a width to be measured is unwound from a spool 13 to ensure its passage successively over a first fixed cylindrical bar 14, under a second fixed cylindrical bar 15 and over a third fixed cylindrical bar 16, before being taken up by a take-up spool 17. Typically, the tension of the reinforcing yarn coming off the spool 13 is between 150 g and 300 g. The cylindrical bars 14-16 are mounted to make it possible to measure the width of the reinforcing yarn under reproducible and predetermined tension conditions. After being tensioned as it passes over the first fixed cylindrical bar 14 and the second fixed cylindrical bar 15, the reinforcing yarn expands at the third cylindrical bar 16, above which a matrix camera 18 is positioned. For example, the first, second and third cylindrical bars 14-16 have diameters of 40 mm, 20 mm and 30 mm respectively, while the center distances between the first and second cylindrical bars on the one hand and between the second and third cylindrical bars on the other hand are 50 mm and 20 mm in the horizontal direction and 15 mm and 10 mm in the vertical direction respectively. Measurements of the width of the reinforcing yarn are made by means of the camera 18 during the running of the reinforcing yarn approximately every 5 mm, over a length of 100 ml (linear meters).

The measurements are performed on carbon fibers from HEXCEL Corporation, Stamford, CT, USA, with different linear densities, different numbers of filaments and different twists, as shown in Table 1 below.

TABLE 1

| Fiber | Intermediate (IM) or High Resistance (HR) modulus | Linear density (tex) | Number of filaments | 0 t/m | 3 t/m | 6 t/m | 8 t/m | 10 t/m | 8 t/m |
|---|---|---|---|---|---|---|---|---|---|
| IMA | IM | 446 | 12000 | x | x | x | x | x | x |
| IM7 | IM | 223 | 6000 | | x | | x | | x |
| AS7 | HR | 800 | 12000 | x | x | x | x | x | x |

Measurements made on carbon reinforcing yarns from Table 1 are shown in FIG. 5, which gives the average width of the reinforcing yarns as a function of twist, for the various reinforcing yarns. FIG. 5 clearly shows that the average width of the reinforcing yarns decreases with increasing twist, which is to be expected as twisting causes the filaments of the twisted reinforcing yarns to tighten.

Examination of FIG. 6, which shows the standard deviation of the average widths as a function of twist, for the various reinforcing yarns in Table 1 reveals that the standard deviations in width decrease with increasing twist. In other words, the twisted reinforcing yarns tend to tighten more evenly as the twist increases. Thus, with increasing twist, a reinforcing yarn with a parallelepipedic cross-section tends toward a round reinforcing yarn with a low standard deviation. It should be noted that non-twisted reinforcing yarn has a low standard deviation compared to twisted reinforcing yarn, and that a twist greater than 14 turns per meter (tpm) should be achieved in order to obtain such low width variability.

It is important to understand that the distribution of the width of the carbon reinforcing yarns affects the possibility of using them to manufacture a web with a given basis grammage.

For example, a 210 grams per square meter web will require the juxtaposition of 12K IMA yarns every 2.12 mm so that the web is theoretically completely covered. The calculation is as follows:

Necessary width for a given basis weight [mm]=Titer of the yarn used [Tex]/basis weight [g/m²]. The unit of measurement for yarn is Tex, which is the weight in grams of 1000 m of yarn.

In practice, it is possible to produce a satisfactory quality web if the reinforcing yarns have an average width of at least 75% of this so-called "target" width value. A person skilled in the art will be able to determine this target width value by trial and error.

Table 2 below lists the target width values by basis weight and by carbon reinforcing yarn used:

TABLE 2

| Carbon fiber | Titer (Tex) | Basis weight g/m² | Target value for length (mm) |
|---|---|---|---|
| IMA 12K | 446 | 140 | 3.18 |
| | | 210 | 2.12 |
| | | 280 | 1.59 |
| | | 350 | 1.27 |
| IM17 6K | 223 | 140 | 1.59 |
| | | 210 | 1.06 |
| | | 280 | 0.8 |
| | | 350 | 0.64 |
| AS7 12K | BOO | 252 | 3.17 |
| | | 350 | 2.11 |

FIGS. 7 to 11 are graphs showing, for various grammages, the percentage of values above the target width value as a function of the twisting for various carbon reinforcing yarns.

FIG. 7 shows that for a 140 g/m² web:

For the IMA-12K fiber, the web can only be made of non-twisted reinforcing yarn;

For the IM7-6K fiber, the web can only be made of reinforcing yarn having a twist less than or equal to 8 turns per meter.

FIG. 8 shows that for a 210 g/m² web:

For the IMA-12K fiber, the web can be made with reinforcing yarns having a twist less than or equal to 8 turns per meter;

For the IM7-6K fiber, the web can be made with reinforcing yarns having a twist of up to 14 turns per meter.

FIG. 9 shows that for a 280 g/m² web, the basis weight becomes high enough to use reinforcing yarns having all the twist values in the range.

FIG. 10 shows that for a 252 g/m² web, made of AS7-12K fiber, the -web can be made with reinforcing yarns having a twist less than or equal to 6 turns per meter.

FIG. 11 shows that for a 350 g/m² web the grammage becomes high enough to use reinforcing yarns having all the twist values in the range.

It thus appears possible to define the twisting limits that can be used for each type of reinforcing yarn, for a given basis weight, which also makes it possible to choose not only the yarns to be used but also the twisting to be applied, depending in particular on the desired grammage of the unidirectional web.

According to another feature of the subject matter of the invention, the unidirectional reinforcing web 2 is formed of at least one twisted carbon reinforcing yarn 3, having either an S-twist, a Z-twist, or a mixture of both. The twisted carbon reinforcing S-twist and Z-twist yarns 3 differ in the direction of twist, as shown on the right in FIG. 17. For definitions of what is meant by S-twist or Z-twist, refer to the book "Handbook of Weaving", p 16-17 by Sabit Adanur, Professor, Department of Textile Engineering, Auburn, USA, ISBN 1-58716-013-7.

As indicated, the unidirectional reinforcing web 2 can be formed by a reinforcing yarn 3 having a twist of 3 turns/m to 15 turns/m, preferably 6 turns/m to 12 turns/m. In this case, the web is classified as unidirectional, because the single reinforcing yarn 3 has a neutral fiber (corresponding to the central axis of the yarn) with a general direction corresponding to the longitudinal direction X of the reinforcing yarn 3 while the filaments follow a helical trajectory around this general direction, as illustrated in FIG. 2. According to an alternate embodiment, the unidirectional reinforcing web 2 is formed of a plurality of reinforcing yarns 3, at least some of which each have a twist of 3 turns/m to 15 turns/m, preferably 6 turns/m to 12 turns/m. Each yarn has an extension direction $D_G$ that corresponds to the centerline of the yarn. The twisted reinforcing yarns 3 forming the unidirectional reinforcing web 2 are arranged side by side and the directions of extension of the twisted reinforcing yarns 3 are parallel to each other, thus forming a unidirectional web. According to the latter embodiment, at least every fifth reinforcing yarn 3, preferably at least every second or third reinforcing yarn 3, and preferably all reinforcing yarns 3, are individually twisted having a twist of 3 turns/m to 15 turns/m, preferably 6 turns/m to 12 turns/m. It should be understood that according to an advantageous embodiment, all the reinforcing yarns 3 forming the unidirectional reinforcing web 2, are individually twisted having a twist of 3 turns/m to 15 turns/m, preferably 6 turns/m to 12 turns/m. In the event that the unidirectional reinforcing web 2 does not exclusively comprise twisted reinforcing yarns, then the unidirectional reinforcing web 2 advantageously comprises the same reinforcing yarns as the reinforcing yarns used to undergo twisting in accordance with the invention that are not twisted.

According to an alternate embodiment in which all the reinforcing yarns 3 forming the unidirectional web 2 are twisted, it is also possible to use within the same web, both one or a plurality of twisted reinforcing S-twist yarn(s) 3 and one or a plurality of twisted reinforcing Z-twist yarn(s) 3. That is, the unidirectional web 2 comprises twisted reinforcing yarns 3 having different twist directions: it is therefore not formed solely of reinforcing Z-twist yarns 3 or reinforcing S-twist yarns 3, but comprises at least one reinforcing Z-twist yarn 3, extending next to one or more reinforcing S-twist yarns 3, or comprises at least one reinforcing S-twist yarn 3, extending next to one or more reinforcing Z-twist yarns 3. In contrast, each yarn has the same S-twist or the same Z-twist and thus the same direction of twist over its entire length, as well as the same twist value.

These alternate embodiments of unidirectional reinforcing webs 2 are referred to in this description as "mixed S/Z unidirectional webs 2" for the sake of simplicity. Obtaining a twisted reinforcing yarn 3 with an S-twist or a twisted reinforcing yarn 3 with a Z-twist is affected by the direction of rotation applied about the B-axis to the bobbin 7, in a twisting machine as shown in FIG. 3. By using various types of twisted reinforcing yarns 3 within the same unidirectional reinforcing web 2, namely at least one with an S-twist and at least one with a Z-twist, it is possible to limit the risks of defects appearing within the unidirectional reinforcing web 2 obtained, in particular the risks of gaps or overlaps between the yarns laid down side by side, as well as the risks of corrugation. The use of the two types of twist (S-twist and Z-twist), within the same unidirectional web, tends to homogenize the local corrugations induced by the Z-twists and S-twists, which have different directions. By combining these two types of yarns in the same unidirectional web, the manufacture and use of mixed S-twist and Z-twist yarns is made simpler and tends to yield a more acceptable quality, in terms of the gap and overlap observed in the web produced, as will be shown in the following examples.

Examples of particularly suitable twisted reinforcing yarns 3 laid side by side to form a mixed S/Z unidirectional web 2 include the following sequences: SZ, SZS, ZSZ, SZZS, SZSZ, SZSZS, SSZZSS, SZSSZS, SZSZSZ SSZZSSZZ.

As illustrated in FIGS. 1B and 1C, a unidirectional web 2 (or 2a) formed of a plurality of carbon reinforcing yarns 3 may be divided into two equal portions each extending on either side of a plane Δ extending perpendicular to the surface of said unidirectional web 2 (and thus extending perpendicular to the surfaces S4 and S5 of the two veils 4,5, when the web is associated with the latter) and parallel to the general direction of extension of the unidirectional web 2. According to a particularly advantageous embodiment of the reinforcing materials according to the invention, the unidirectional webs 2 (of the mixed S/Z type) comprise more than 3 individually twisted carbon reinforcing yarns 3 having a twist of 3 turns/m to 15 turns/m, preferably of 6 turns/m to 12 turns/m, with:

in the case where the total number of twisted carbon reinforcing yarns 3 forming the unidirectional web 2 is even:

the number of twisted carbon reinforcing S-twist yarns 3 on one side of the plane Δ and the number of twisted carbon reinforcing S-twist yarns 3 on the other side of the plane Δ which are each independently an integer in the range {[(total number of yarns)/4]−35%; [(total number of yarns)/4]+35%}, each endpoint of the range being rounded to the nearest integer if the formula defining it results in an integer, the other twisted carbon reinforcing yarns 3 being Z-twist yarns (definition P1);

which is equivalent to the number of twisted carbon reinforcing Z-twist yarns 3 on one side of the plane Δ and the number of twisted carbon reinforcing Z-twist yarns 3 on the other side of the plane Δ being, each independently, an integer in the range {[(total number of yarns)/4]−35%; [(total number of yarns)/4]+35%}, each endpoint of the range being rounded to the nearest integer if the formula defining it results in an integer, the other twisted carbon reinforcing yarns 3 being S-twist yarns (definition P2);

in the case where the total number of twisted carbon reinforcing yarns 3 forming the unidirectional web 2 is odd:

the number of twisted carbon reinforcing S-twist yarns 3 on one side of the plane Δ and the number of twisted carbon reinforcing S-twist yarns 3 on the other side of the plane Δ, which are either two integers or two and a half integers, and are, each independently, in the range {[(total number of yarns)/4]−35%; [(total number of yarns)/4]+35%}, each endpoint of the range being rounded to the nearest integer or integer and a half if the formula defining it results in an integer or integer and a half, the remaining twisted carbon reinforcing yarns 3 being Z-twist yarns (definition I1);

which is equivalent to the number of twisted carbon reinforcing Z-twist yarns 3 on one side of the plane Δ and the number of twisted carbon reinforcing Z-twist yarns 3 on the other side of the plane Δ being either two integers or two and a half integers, and are each independently in the range {[(total number of yarns)/4]−35%; [(total number of yarns)/4]+35%}, each endpoint of the range being rounded to the nearest integer or integer and a half if the formula defining it results in an integer or integer and a half, the remaining twisted carbon reinforcing yarns 3 being S-twist yarns (definition I2).

The plane Δ is the plane parallel to the general direction of extension of said unidirectional web 2 which divides said unidirectional web into two equal parts, being perpendicular to its surface. FIG. 1C illustrates a material according to the invention comprising a unidirectional web 2a formed of a series of twisted reinforcing SZSZSZ yarns 3, on which the plane Δ is shown.

By "are, each independently, in the range" in the definitions P1, P2, I1 and I2, it is meant that the two numbers concerned are within to the range, but may either be identical or different.

As examples of possible configurations in the case of a total odd number of twisted reinforcing yarns 3 forming a unidirectional web 2, if this total number of twisted reinforcing yarns 3 is 17 (so that there are 8.5 yarns on either side of the plane Δ), then:

according to definition I1, the range {[(total number of yarns)/4]−35%; [(total number of yarns)/4]+35%} is equal to {[(17/4]+35%; [(17)/4]+35%}={4.25−35% (4.25); 4.25+35% (4.25)} which after rounding off the endpoints yields {3; 5.5}. Thus, there may be 3 to 5.5 S yarns on each side of the plane Δ, or 6 to 11 S-twist yarns in total, with the remaining yarns being Z-twist yarns, or 6 to 11 Z-twist yarns in total, with 3 to 5.5 Z-twist yarns on each side of the plane Δ;

according to definition I2, we arrive at the same numbers of possible S and Z yarns on each side of the plane Δ.

With such configurations, the number of twisted reinforcing S-twist yarns and Z-twist yarns 3 within the unidirectional reinforcing web 2 are more balanced, resulting in easier to manufacture and higher quality unidirectional webs 2. Indeed, in such cases, the alignment between the twisted reinforcing yarns 3 is facilitated and there is a reduction in gaps, ripples and/or overlaps between the twisted reinforcing yarns 3 laid down parallel and side by side, during the formation of the unidirectional reinforcing web 2, as explained in the examples. Further, during the automated production of several reinforcing materials 1, in parallel, as described in application WO 2010/061114, cutting of the nonwoven materials at the junction between two reinforcing materials 1 produced in parallel, leads, in this case, to sharper edges and more homogeneous materials.

Further, the reinforcing material 1 produced from such mixed S/Z webs will, as a result, also be of better quality and thus the composite parts produced as well. In addition, application by means of automated application devices, such as those described in EP 2 376 276, can be more precise with such reinforcing materials. As will be explained in the examples, such reinforcing materials 1 remain better centered in the guides or guiding members (of the groove or comb type in particular) present at the level of the heads or applying fingers of the automated application devices, whereas reinforcing materials 1 made from a unidirectional reinforcing web 2, comprising only reinforcing S-twist yarns 3 or only reinforcing Z-twist yarns 3, or more generally not meeting the definitions P1, P2, I1 and I2, tend to be off-center and to come into abutment on the edges of the guides or guiding members on which they travel.

In particular, the unidirectional reinforcing webs 2 comprising a sequence of totally alternating S-twist and Z-twist reinforcing yarns 3 is preferred, namely those corresponding to the configurations (sequence of yarns laid side by side) (SZ)i, S(ZS)j, Z(SZ)j, with i and j being integers in particular within the range from 1 to 20, preferably within the range from 1 to 10. In particular, i and j will be within the range from 2 to 20, preferably within the range from 2 to 10.

Other mixed S/Z unidirectional web configurations that are particularly satisfactory are those that have the same number of S-twist yarns, and therefore by implication, the same number of Z-twist yarns as well, on both sides of the plane Δ. The following configurations are some examples: SZZS, SZSZ, SZSZS, SZSSZS.

Other mixed S/Z unidirectional web configurations that are particularly satisfactory are those that are symmetrical about the plane Δ. Some examples of these configurations are SZZS, SZSZS, SZSSZS, SZSSZSSZS.

Thus, the use of mixed S/Z unidirectional webs, and in particular those more precisely described within the scope of the invention, solves a twofold technical problem, both during the manufacture and during the application of the reinforcing material 1 obtained. These materials offer, in particular, the possibility of being produced and applied according to industrial methods.

The use of mixed S/Z unidirectional webs, and in particular those more precisely described within the scope of the invention, is particularly suitable for the production of unidirectional webs 2, and thus of reinforcing materials 1, having a width greater than 7 mm, preferably greater than 12 mm, and preferably within the range from 12 mm to 51 mm. Further, the invention using a mixed S/Z unidirectional web is also particularly suitable for reinforcing materials, which have a length of more than 2 m, in particular a length of 2 m to 5000 m, preferably 100 m to 2000 m. Thus, according to such preferred embodiments within the scope of the invention, the reinforcing materials according to the invention have a width of more than 7 mm and a length of more than 2 m, and advantageously a width within the range from 12 mm to 51 mm and a length within the range from 2 m to 5000 m, preferably, from 100 m to 2000 m. The width of the material is its average width taken perpendicularly to the general direction of extension of the unidirectional sheet: the width can be measured using any suitable means, in particular a camera, by taking measurements every 10 cm, over the entire length of the material, and by taking the arithmetic mean of the measurements obtained. The length of the material, will, preferably, be measured, on the plane Δ. In particular, the width of the reinforcing material 1 can be measured by making it run at a constant speed of 1.2 m per minute, with a constant tension between 200 cN and 400 cN, and by making it pass, at a distance of 265 mm and without support at this point, in front of a camera, for example, a Baumer Optronic Type FWX 20, focal length 20 mm, 1624×1236 pixels (Baumer Optronic Gmbh, Germany—the calibration of the camera is as follows: 1 pixel is equivalent to 0.05 mm) or another camera suitable for larger widths of reinforcing material. In particular, automated application devices exist for applying materials having a width of 6.35 mm, 12.7 mm, 38.1 mm, and 50.8 mm and can be implemented within the scope of the invention.

Further, this embodiment of the invention using a mixed S/Z unidirectional web is particularly suitable for the production of reinforcing material 1 by associating the nonwoven materials with each of the faces of the unidirectional reinforcing web, continuously, and this by making the reinforcing material pass through during manufacture, by means of a motorized conveying system or device.

Advantageously, each twisted reinforcing yarn 3 entering into the formation of the unidirectional reinforcing web 2 has a twisting value that is substantially identical over its entire length. It should be noted that all the twisted reinforcing yarns 3 that form the unidirectional reinforcing web 2 can have either an identical or a different twist value. Preferably, all the twisted reinforcing yarns 3 that form of the unidirectional reinforcing web 2 have the same twist value.

Within the scope of the invention, the unidirectional reinforcing web 2 has a grammage within the range from 126 g/m$^2$ to 280 g/m$^2$, in particular from 126 g/m$^2$ to 210 g/m$^2$ and preferably from 210 g/m$^2$ to 280 g/m$^2$.

The grammage of the unidirectional web within the reinforcing material corresponds to that of the unidirectional web before its association with the veils, but it is not possible to measure the weight of the unidirectional web before its association with the veils 4, 5 because the reinforcing yarns have no cohesion between them. The grammage of the carbon fiber reinforcing web can be determined from the grammage of the reinforcing material 1 (unidirectional web 2 and the two veils 4, 5). If the basis weight of the veils is known, it is then possible to deduce the basis weight of the unidirectional web.

Advantageously, the basis weight is determined from the reinforcing material by chemical attack (potentially also by pyrolysis) of the veil. This type of method is classically used by a person skilled in the art to determine the carbon fiber content of a fabric or a composite structure.

A method for measuring the grammage of the reinforcing material 1 is described below. The grammage of the reinforcing material is measured by weighing cut samples of 100 cm$^2$ (that is, 113 mm in diameter). To facilitate cutting samples of the reinforcing material, which is flexible, the reinforcing material is placed between two glossy cardboards from Cartonnage Roset (Saint Julien en Genevois, France) of 447 g/m² and of 0.450 mm thickness to ensure a certain rigidity of the whole. A pneumatic circular die from Novi Profibre (Eybens, France) is used to cut the assembly; 10 samples are taken per type of reinforcing product manufactured.

It is clear from the foregoing description that the reinforcing material 1 advantageously consists of a unidirectional reinforcing web 2 associated on each of its faces with a veil or a layer of polymeric fibers 4, 5 chosen from nonwoven materials. Generally speaking, the method for preparing the reinforcing material 1 in accordance with the invention comprises the following successive steps:

a1) providing a unidirectional reinforcing web formed of one or a plurality of individually twisted reinforcing yarns 3 having a twist of 3 turns/m to 15 turns/m, a2) providing at least two layers of polymeric fibers 4, 5 selected from nonwoven materials, a3) associating each of the polymeric fiber layers with each of the faces of the unidirectional reinforcing web.

In general, the unidirectional reinforcing web 2 of step at) will have a basis weight equal to that desired in the final reinforcing material 1 and a width equal to the desired width of the final reinforcing material 1.

Advantageously, the preparation method comprises, upstream of step a1), a step of making the unidirectional reinforcing web 2 comprising the application of a twist of 3 turns/m to 15 turns/m to a reinforcing yarn or to a series of reinforcing yarns 3, said twist being applied individually to each reinforcing yarn 3.

According to an alternate embodiment of the preparation method, the unidirectional reinforcing web 2 is formed of a plurality of reinforcing yarns and the method comprises, upstream of step a1):

i) applying a twist of 3 turns/m to 15 turns/m to a series of reinforcing yarns, said twist being applied individually to each yarn, ii) aligning the twisted yarns thus obtained, potentially with other reinforcing yarns, and arranging said yarns side by side, so as to form a unidirectional reinforcing web In the case of a web consisting exclusively of twisted reinforcing yarns 3, the use of yarns not all having the same S-twist or Z-twist type facilitates the alignment and arrangement of the yarns during step ii). Thus, in step ii), advantageously, the choice of the yarns that are aligned will be made so as to obtain one of the mixed S/Z unidirectional webs as described in the present invention.

Thus, according to one embodiment, the method for preparing the reinforcing material 1 according to the invention comprises the following successive steps:

a1) providing a unidirectional reinforcing web as defined within the scope of the invention, referred to as a mixed unidirectional web S/Z, a2) providing two polymeric layers which are nonwoven materials 4, 5, a3) proceeding with the association of each of the nonwoven materials with one of the faces of the unidirectional reinforcing web.

Advantageously, the preparation method comprises, upstream of step a1), a step for the production of the unidirectional reinforcing web 2 comprising, firstly, the application of a twist of 3 turns/m to 15 turns/m to a yarn or to a series of carbon S-twist yarns 3, said twist being applied individually to each carbon yarn 3 and, secondly, applying a twist of 3 turns/m to 15 turns/m to a Z-twist yarn carbon yarn 3 or to a series of Z-twist carbon yarns 3, said twist being applied individually to each carbon yarn 3.

According to an advantageous characteristic, the layers of polymeric fibers 4, 5 which are nonwoven materials having hot tack properties and the association of step a3) is obtained by applying each of the layers of polymeric fibers to each of the faces of the unidirectional reinforcing web, said application being accompanied or followed by heating of the polymeric fibers, causing them to soften or melt, which is then followed by cooling.

The unidirectional web 2 is associated, on each of its faces, with a veil of polymeric fibers 4, 5 to produce a reinforcing material 1 as shown in FIG. 1A. The use of a symmetrical reinforcing material makes it possible to avoid any stacking error, during its manual or automatic laying down for the formation of composite parts, and thus to limit the generation of defects, in particular an interply without a veil. This is the reason that, advantageously, the unidirectional web 2 is associated, on each of its faces, with a polymeric fiber veil 4, 5, the two veils 4, 5 being identical.

"Porous polymeric layer" means a permeable layer allowing a liquid such as a resin to pass through the material to be injected or infused through the material during the formation of a preform or a composite part. In particular, the openness factor of such a layer determined according to the method described in application WO 2011/086266, is within the range from 30% to 99%, preferably is within the range from 40% to 70%. Particularly advantageous examples of such layers are nonwoven materials or webs.

Within the scope of the invention, "polymeric fiber layers" means a veil or nonwoven material.

"Nonwoven material" or "ply", conventionally means a set of continuous or short fibers potentially arranged randomly. These nonwoven materials or veils can, for example, be produced by the drylaid, wetlaid or spunlaid methods, for example by extrusion ("Spunbond"), meltblown extrusion ("Meltblown"), fiberized spray applicator or solvent spinning ("electrospinning", "Flashspining", "Forcespinning"), which are all well known to those skilled in the art. In particular, the constituent fibers of the nonwoven material may have an average diameter within the range from 0.5 μm to 70 μm, and preferably 0.5 μm to 20 μm. The nonwoven materials can be made of short fibers or, preferably, continuous fibers. In the case of a nonwoven material made of short fibers, the fibers may have, for example, a length between 1 mm and 100 mm. Preferably, the nonwoven materials used provide random and preferably isotropic coverage.

Within the scope of the invention, as the reinforcing materials are classified as dry, the total weight represented by the nonwoven materials 4 and 5 does not exceed 10% of the total weight of the reinforcing material 1 according to the invention, and, typically, represents from 0.5% to 10% of the total weight of the reinforcing material 1, and preferably from 2% to 6% of its total weight.

Within the scope of the invention, the nonwoven materials or veils used are advantageously thermoplastic in nature and, in particular, consist of a thermoplastic polymer, a partially crosslinked thermoplastic polymer, a mixture of such polymers, or a mixture of thermoplastic and thermosetting polymers. The thermoplastic or thermosetting nonwoven materials or veils are preferably made of a thermoplastic material selected from: Polyamides (PA: PA6, PA12, PA11, PA6,6, PA 6,10, PA 6,12, . . . ), Copolyamides (CoPA), Polyamides—block ether or ester (PEBAX, PEBA), Polyphthalamide (PPA), Polyesters (Polyethylene terephthalate—PET-, Polybutylene terephthalate—PBT- . . . ), Copolyesters (CoPE), Thermoplastic polyurethanes (TPU), Polyacetals (POM . . . ), Polyolefins (PP, HDPE, LDPE, LLDPE) . . . . Polyethersulfones (PES), Polysulfones (PSU . . . ), Poly-phenylenesulfones (PPSU . . . ), Polyetheretherketones (PEEK), Polyetherketoneketones (PEKK), Poly(Phenylene Sulfide) (PPS), or Polyetherimides (PEI), thermoplastic polyimides, liquid crystal polymers (LCP), phenoxys, block copolymers such as Styrene-Butadiene-Methyl methacrylate (SBM), Methyl methacrylate-Butyl methacrylate (MAM) copolymers or a mixture of fibers made of these thermo-plastic materials. The material is of course suitable for the various types of thermoset systems used for the matrix formation during the subsequent production of the compos-ite parts.

The thickness of the veils prior to their association with the unidirectional web is chosen, depending on how they are will be associated with the unidirectional web. In most cases, their thickness will be very close to the desired thickness of the reinforcing material. It may also be possible to choose a veil of greater thickness which will be laminated under temperature during the association stage, so as to achieve the desired thickness. Preferably, the unidirectional web is associated on each of its large faces with two substantially identical veils, so as to obtain a perfectly symmetrical reinforcing material. The thickness of the veil before association on the unidirectional carbon web is, in particular, between 0.5 $\mu$m and 200 $\mu$m, preferably between 10 $\mu$m and 170 $\mu$m. On the reinforcing material 1 according to the invention, the thickness of each veil 4, 5 after association with the unidirectional web, is within the range from 0.5 microns to 50 microns, preferably in the range from 3 microns to 35 microns. The thickness of the various nonwoven materials before association is determined by NF EN ISO 9073-2 using method A with a test area of 2827 $mm^2$ (60 mm diameter disk) and an applied pressure of 0.5 kPa.

Further, advantageously, the basis weight of the veils 4, 5 is within the range from 0.2 $g/m^2$ to 20 $g/m^2$.

The association between the unidirectional web 2 and the veils 4, 5 can be performed in a discontinuous manner, for example only at certain points or zones, but is preferably performed with a bond that extends over the entire surface of the web, classified as continuous.

The association of the unidirectional web 2 with the two veils 4, 5 is advantageously performed according to the method described in patent application WO 2010/046609 or one of the methods described in application WO 2010/061114. Continuous production machines and lines, as described in these documents, or in the examples of the invention may be used. Within the scope of the invention, and in particular when a mixed S/Z unidirectional web is used, it is possible to produce reinforcing materials by combining the nonwoven materials present on each of the faces of the unidirectional reinforcing web, in a continuous manner, by making the reinforcing material resulting from said association pass through a motorized conveying system or device. Such devices are, for example, conveyor belts, driven by one or more drive rollers, between which the reinforcing material circulates, after the unidirectional web has been placed between the two nonwoven materials, to ensure their application on the latter.

In addition, the unidirectional web can be bonded to the two webs by means of an adhesive layer, for example selected from epoxy adhesives, polyurethane adhesives, thermosetting glues, polymerizable monomer-based adhe-sives, structural acrylic or modified acrylic adhesives, and hot-melt adhesives. However, the association is usually achieved by means of the hot tack properties of the heated veils, for example during a thermocompression step ensur-ing a bond between the unidirectional web and the plies. This step results in the softening of the thermoplastic fibers of the ply, allowing the unidirectional web to be bonded to the veils, after cooling. The heating and pressure conditions are adapted to the material of the veils as well as to their thickness. A thermocompression step is usually performed over the entire surface of the unidirectional web at a tem-perature ranging from Tf veil–15° C. to Tf veil+60° C. (with Tf veil designating the melting temperature of the web) and under a pressure of 0.1 MPa to 0.6 MPa. It is thus possible to achieve compression ratios of the veil before and after association ranging from 1 to 10. The step of laminating the veil onto the unidirectional carbon web 2 is also essential for correctly controlling the final thickness of the reinforcing material 1. Indeed, depending on the temperature and pres-sure conditions, particularly during lamination, it is possible to modify, and therefore adjust, the thickness of the veil present on each side of the reinforcing material.

The reinforcing material according to the invention is easy to handle, due to the presence of thermoplastic veils laminated on each of the faces of the unidirectional web. This architecture also facilitates cutting, without fraying in particular, in directions that are not parallel, in particular transverse or oblique, to the fibers of the unidirectional web.

The reinforcing materials 1 according to the invention are flexible and windable. They can be produced in long lengths corresponding to the available lengths of carbon yarn. After being manufactured, they are usually wound in the form of a roll around a spool, before being used for the subsequent manufacture of preforms and parts.

In order to produce composite parts, a stack or drape of reinforcing materials (also referred to as plies) according to the invention is produced. In a conventional manner, a reinforcing material according to the invention is cut to the desired size, for the production of the part, the ply, the stack or the preform to be made. In a stack, several plies of reinforcing material are stacked on top of each other.

A ply can be made from a single reinforcing material according to the invention, when the reinforcing material is sufficiently wide to produce the desired part and when the part is slightly complex. But more often, in the case of large parts, or complex parts, a ply is made from an assembly of reinforcing materials 1 according to the invention which are arranged side by side, to cover the entire surface necessary to produce the desired part. In this case, precise placement of the reinforcing material is required. In automated meth-ods, the devices for conveying and applying the reinforcing materials comprise one or more guide members or guides in which the reinforcing material is conveyed and transported. Devices comprising application heads equipped with such guide members or guides are, in particular, described in documents WO 2006/092514 and EP 2 376 276. Coriolis Composites SASU (rue Condorcet 56530 Queven, FRANCE), MTorres Disenos Industriales SAU (Torrez de Elorz, Navarra, SPAIN) ElectroImpact Inc (Mukilteo WA 98275, UNITED STATES), Mikrosam DOO (7500 Prilep MACEDONIA) also offer such devices. Within the scope of the invention, it was found that centering reinforcing mate-rials 1 according to the invention comprising a mixed S/Z unidirectional web, and in particular one of those more precisely described within the scope of the invention, resulted in more precise placement and thus a reduction in the risks of defects such as gaps, overlaps, wrinkles, or corrugations during application. Thus, parts made with reinforcing materials 1 according to the invention compris-ing a mixed S/Z unidirectional web, and in particular one of those more precisely described within the scope of the invention, are particularly satisfactory.

Further, in order to produce a composite part, several plies are placed one on top of the other to produce a stack of plies. Thus, the imperfections on the reinforcing materials 1 are reproduced in each ply and are therefore accentuated on a stack. Therefore, again, reinforcing materials 1 according to the invention comprising a mixed S/Z unidirectional web which have more homogeneous and reproducible characteristics are particularly advantageous. In the resulting stack, the plies are generally arranged, so that at least two unidirectional webs of the plies are oriented in different directions. From one ply to another, all the unidirectional webs or only some of them may have different directions, the others may have identical directions. The preferred orientations are most often in the directions making an angle of 0°, +45° or −45° (also corresponding to +135°), and +90° with the main axis of the part to be produced. The main axis of the part is generally the largest axis of the part and the 0° is merged with this axis. It is, for example, possible to make quasi-isotropic, symmetrical, or oriented stacks by choosing the orientation of the folds. As examples of quasi-isotropic stacking, stacking may have the angles 45°/0°/135°/90°, or 90°/135°/0°/45°. Examples of symmetrical stacking include 0°/90°/0°, or 45°/135°/45°. Before adding the resin necessary to produce the part, it is possible to join the plies together within the stack, in particular by an intermediate step of preforming under temperature and vacuum or welding at a few points after the addition of each ply, and thus to produce a preform. In particular, an assembly of 2 to 300 plies, in particular 16 to 100 plies, can be considered.

Advantageously, the stack is not joined together by sewing or knitting, but rather by a weld produced by means of the polymeric, and in particular, the thermoplastic, characteristics of the veils present within the stack. For this purpose, a heating/cooling operation is performed over the entire surface of the stack or at least in certain zones of the surface of the stack. The heating causes the veil to melt or at least to soften. Such bonding using the thermoplastic character of the veil is advantageous because it avoids all the disadvantages of the presence of sewing or knitting yarns, such as in particular the problems of corrugation, microcracking, and the reduction of the mechanical properties of the composite parts subsequently obtained.

Stacking can be achieved by adding, each ply one at a time, and bonding after each ply addition. One example is automated ply application as described in patent applications WO 2014/076433 and WO 2014/191667. Also, the applied plies (by prior heating of the plies either one at a time or without heating) may be heated again in a global manner in order to obtain, for example, a shaped preform from plies applied flat. The person skilled in the art can then use conventional means for hot forming, with application of temperature and pressure (vacuum or press system for example). In particular, the application of a reinforcing material according to the invention can be performed continuously with the application of pressure perpendicular to the application surface in order to apply it thereto, according to the methods known the abbreviations AFP (Automated Fiber Placement) or ATL (Automated Tape Lay-up) for example as described in the aforementioned documents WO 2014/076433 A1 or WO 2014/191667.

In order to produce composite parts, a resin or matrix of the thermosetting or thermoplastic type or a mixture of thermosetting and thermosetting resins is then added, for example by injection, into the mold containing the plies (Resin Transfer Molding process), or by infusion (through the thickness of the plies: Liquid Resin Infusion process or Resin Film Infusion process). According to a non-preferred embodiment, it is also possible to perform, before stacking, manual coating/impregnation by means of a roller or a brush, on each of the plies, applied successively onto the shape of the mold used.

The matrix used is of the thermosetting or thermoplastic type or a mixture of thermoplastic and thermosetting resins. The injected resin is chosen, for example, from the following thermosetting polymers: epoxides, unsaturated polyesters, vinyl esters, phenolics, polyimides, and bismaleimides.

The composite part is then obtained after a heat treatment step. In particular, the composite part is generally obtained by a conventional hardening cycle of the polymers considered, by performing a heat treatment, recommended by the suppliers of these polymers, and known to the person skilled in the art. This step of hardening the desired part is performed by polymerization/crosslinking according to a defined cycle in temperature and under pressure, followed by cooling. The pressure applied during the treatment cycle is low in the case of vacuum infusion and higher in the case of injection into an RTM mold.

The stacking and bonding methods described above can also be implemented with any type of reinforcing material intended to be associated with a thermosetting resin for the production of composite parts, which are made from a unidirectional web of carbon fibers associated, on each of its faces, with a veil of thermoplastic fibers and in particular with reinforcing materials other than those defined in the claims of the present patent application. Indeed, irrespective of the unidirectional veils and webs used, such stacks are advantageous in terms of drapability and permeability. Of course, preferably, the reinforcing materials conform, in terms of thickness and grammage, to those described within the scope of the invention, given that they make it possible to achieve, by means of vacuum infusion, high fiber volume rates (FVR).

The following examples are provided to illustrate the invention, but are not intended to be limiting.

A first series of tests was performed to yield the data presented in Table 3 below.

Part A

TABLE 3

| Material | Comparative Material 1 | Comparative Material 2 | Comparative Material 3 | Material 4 invention | Material 5 invention | Material 6 invention | Material 7 invention | Material 8 invention | Material 9 invention |
|---|---|---|---|---|---|---|---|---|---|
| Reinforcing fibers | | | | Hexcel IMA 12 K | | | | | |
| Polymeric binder | | | | 1R8 4 g/m² per face | | | | | |
| Width of the web | | | | 6.35 mm | | | | | |
| Number of carbon yarns | 3 | 3 | 4 | 3 | 3 | 3 | 3 | 4 | 4 |
| Basis weight of UD reinforcing fibers (g/m2)) | 210 | 210 | 280 | 210 | 210 | 210 | 210 | 280 | 280 |

US 12,606,941 B2

23                                                                                                                                    24

TABLE 3-continued

| | | | | | | | | | |
|---|---|---|---|---|---|---|---|---|---|
| Micro-perforation | | No | Yes | Yes | No | No | No | No | No | No |
| Twisting | Yes/No | No | No | No | Yes | Yes | Yes | Yes | Yes | Yes |
| | Number of turns/meter | | | | 10 | 8 | 6 | 15 | 10 | 8 |
| | Number of twisted yarns | | | | All | All | All | 1 of 3 | All | All |
| | Twisting direction | | | | S | S | S | S | S | S |

| Material | Material 10 invention | Material 11 invention | Material 12 invention | Material 13 | Material 14 | Material 15 | Material 16 | Material 17 | Material 18 |
|---|---|---|---|---|---|---|---|---|---|
| Reinforcing fibers | | | | Hexcel IMA 12 K | | | | | |
| Polymeric binder | | | | 1R8 4 g/m2 per face | | | | | |
| Width of the web | | | | 6.35 mm | | | | | |
| Number of carbon yarns | 5 | 5 | 6 | 3 | 3 | 4 | 4 | 5 | 5 |
| Basis weight of UD reinforcing fibers (g/m2)) | 350 | 350 | 420 | 210 | 210 | 280 | 280 | 350 | 350 |
| Micro-perforation | No | No | No | No | No | No | No | No | No |
| Twisting Yes/No | Yes | Yes | Yes | Yes | Yes | Yes | Yes | Yes | Yes |
| Number of turns/meter | 10 | 14 | 10 | 20 | 30 | 20 | 30 | 20 | 30 |
| Number of twisted yarns | All | All | All | All | All | All | 1 of 3 | All | All |
| Twisting direction | S | S | | S | S | S | S | S | S |

In Table 3 above, the reinforcing materials 1 tested comprise unidirectional reinforcing webs associated with a veil on each side.

12K Intermediate modulus (IM) carbon yarns marketed by HEXCEL Corporation, Stamford, CT, USA were used in the unidirectional reinforcing web. Materials 1 through 3 use such non-twisted carbon reinforcing yarns. Materials 4 to 12 are reinforcing materials according to the invention having individually twisted carbon reinforcing yarns as explained above (twisted yarns). Materials 13 to 18 are reinforcing materials made with twisted yarns having a greater twist than envisioned by the invention and cannot be made because the material separates either at the production stage or at the handling or application stages, thus making it unusable.

For layers of polymeric fibers selected from nonwoven materials, the 4 g/m$^2$ copolyamide nonwoven 1R8 D04 marketed by Protechnic was used. The veils were associated with the unidirectional web of carbon reinforcing yarns according to patent application WO 2010/046609. More precisely, the reinforcing materials 1 according to the invention were made on a production line using a machine and parameters as described in application WO 2010/061114 and described below, with reference to FIG. 19.

Carbon yarns 3 of the desired twist were unwound from corresponding spools 30 of carbon yarns attached to a creel 40, passed through a comb 50, fed into the machine axis by means of a guide roller 60, a comb 70, and a guide bar 80a.

Carbon yarns 3 were preheated by a heating bar 90 and then spread by a spreading bar 80b and a heating bar 100 to the desired carbon basis weight for the unidirectional web 2. The veil rolls 13a and 13b were unrolled without tension and transported by means of continuous belts 15a and 15b secured between the free rotating, non-motorized rolls 14a, 14b, 14c, 14d and the heated bars 12a, 12b.

Veils 4 and 5 were preheated in zones 11a and 11b before coming into contact with the carbon yarns 3 and laminated on either side of two heated bars 12a and 12b having an air gap that was controlled. A calender 16, which can be cooled, then applied pressure to the unidirectional web with a veil on each side, to produce the reinforcing material 1 in the form of a tape. A deflection roller 18 makes it possible for the reinforcing material 1 to be redirected to the traction system comprising a motor-driven take-up trio 19 and then to a winding arrangement 20 to form a roll of the reinforcing material 1 thus formed.

It should be noted that, in this production line, that instead of being motorized, the belts are pulled by the reinforcing yarns themselves.

Further, as explained in application WO 2010/061114 and presented in its FIG. 8, several reinforcing materials according to the invention, presented in the form of tapes were manufactured simultaneously. Each twisted carbon yarn forming the unidirectional web to be formed was drawn from a roll of the selected twisted yarn previously manufactured. Unidirectional webs of the desired width were made, in parallel, with the selected number of yarns, and were positioned in a spaced manner, leaving sufficient space between each unidirectional web. A single nonwoven material (corresponding to veils 4 and 5) covering the various unidirectional webs 2 and the gaps was therefore associated with all the unidirectional webs 2 on each of their faces. The nonwoven materials, after they had been laminated to the webs, were then cut by means of heated cutting elements between each unidirectional web formed, thus resulting in various reinforcing materials according to the invention, which were produced side by side. The gap between each unidirectional web was within the range from 0.5 mm to 2 mm, so that cutting between each unidirectional web along its edges could be performed, resulting in various reinforcing materials, produced continuously and in parallel.

1) Vacuum Thickness:

During automated application of complex shapes or thick preforms, it is important to have a material that swells as little as possible, and therefore to have a applied material thickness close to the final thickness of the composite part.

Indeed, if the material presents a significant overrun, thus a thickness much higher than the final thickness after manufacture of the laminate, significant defects will be present on the part. The defects will be mainly due to over-lengths and will generate wrinkles. This is not acceptable to the skilled person. In order to characterize this property, the thickness of a preform is measured after automated application before and after placement under vacuum.

As illustrated in FIG. 12, 200×200 mm preforms P were formed having a symmetrical quasi-isotropic stacking, more precisely having the [+45/0/−45/90]3s draping. Preform P is placed on a plate. A FANUC robot and a HEIDENHEIM/ST3077 LVDT probe were used to measure the thickness. The tip of the probe is a 50 mm diameter circular key. The probe measures the thickness of the preform on 5 points P1 to P5, which then makes it possible to obtain an average thickness value for the preform. A measurement is made every 50 mm in x and 50 mm in y.

The preform is then placed under vacuum (residual pressure lower than 15 mbar) using a vacuum bag and a pump. The thickness of the assembly is then measured, and the thickness of the consumables is deducted to obtain the thickness of the preform under vacuum.

The ratio of the thickness without vacuum to the thickness under vacuum is then calculated. The higher this ratio is, the greater the thickness without vacuum compared to the thickness under vacuum and the greater the risk of having defects on the final part. The goal is to minimize this ratio.

Table 4 below summarizes the ratio of the thickness (thickness without vacuum) divided by the theoretical thickness (thickness under vacuum) for materials 2 through 12.

preform thickness and the appearance of defects (such as wrinkles, fraying, ply separation, and the like) which results in poor preform quality.

An industrial type automated ply application test was performed with twisted reinforcing yarns. A Coriolis C1 robot equipped with a Coriolis 16 ply ¼" AFP head and a 12 kw laser type heating means was used to perform the lay-up. In this particular case, only 8 of 16 webs were applied at the same time, side by side. The heating law followed is described in table 5 below.

TABLE 5

| | V min (m/s) | V max (m/s) | P min (W) | P max (W) |
|---|---|---|---|---|
| Heating Law 1st ply | 0.01 | 0.6 | 250 | 800 |
| Heating Law X plies (X > 1) | 0.01 | 0.6 | 180 | 680 |

Plies made of twisted reinforcing yarns were successively draped at 0° on a suction table to form a preform of 500 mm (in the 0° direction) by 150 mm. The beginning of the reinforcing yarn laying, which is done according to the laying direction represented by the arrow F, is always located at the same place on the preform (rectangular zone Z1 on FIG. 13). Thus, the thickness studied was located in this zone Z1.

After the draping of each ply, thickness measurements in the area of the beginning of the lay-up (points P'1, P'2, P'3 inside the zone Z1) of the preform were performed by means

TABLE 4

| Material | Comparative material 2 | Comparative material 3 | Material 4 invention | Material 5 invention | Material 8 invention | Material 9 invention | Material 10 invention | Material 11 invention | Material 12 invention |
|---|---|---|---|---|---|---|---|---|---|
| Ratio of thickness divided by theoretical thickness for 60% FVR | 1.58 | 1.49 | 1.18 | 1.32 | 1.26 | 1.Z6 | 1.28 | 1.32 | 1.23 |

Compared to materials 2 and 3 of the prior art, materials 4 to 12 according to the invention make it possible to minimize the ratio of the thickness without vacuum to the thickness under vacuum. The subject matter of the invention thus allows for a reduction in overrun.

2) Effect of Twisting on the Quality of Automated Dispensing.

It is essential that the automated preform application step not create defects in the preform. The architecture of the reinforcing yarn can affect the quality of the application. Thus, it is necessary to determine if the twisting of the reinforcing yarns has an impact on the quality of the preform after application.

More precisely, the twisting of the reinforcing yarns can have an effect on the so-called "shearing" phenomenon. During the superimposed lay up of reinforcing materials (unidirectional web 2 and veils 4, 5), the reinforcing yarn of a ply located just below the next ply is subjected to shearing, due to the pressure and the movement of the robot head at the time of lay-up. This shear is most prevalent in the early part of the lay-up. As several plies are applied, this intra-ply shear can intensify, which results in a local increase of the of a marking gauge, a support made from aluminum bars and a weight of 1 kg, representing a pressure of 0.02 bar applied to the preform at the time of the thickness measurement. During the measurement, the thickness measuring device is always positioned at the same place. After each ply application, it is removed in order to make it possible for the robot to pass and then to be repositioned after the application. The draping stops when the quality of the preform is judged to be unsatisfactory.

Materials 4 and 8 according to the invention (Table 3) were compared to comparative materials 2 and 3, respectively.

FIGS. 14 and 15 show the change in the overrun as a function of the number of plies applied for comparative material 3 and material 8 according to the invention (FIG. 14) and for comparative material 2 and material 4 according to the invention (FIG. 15).

Note that overrun is defined as the ratio of the total thickness of the preform with X applied plies to the number of applied plies X.

Overrun (in mm)=total thickness of the preform (in mm)/number of plies applied.

This gives an indication of the average thickness of a ply and thus allows the overrun phenomenon to be quantified. To maximize the expansion phenomenon, a stack of reinforcing materials is made with unidirectional webs extending at 0°.

As shown in FIGS. 14 and 15, the change in thickness per ply as a function of the number of plies applied is lower for twisted reinforcing yarns (material 8 or 4 according to the invention, respectively) than with the micro-perforation process (comparative material 3 or 2, respectively). The results with twisted reinforcing yarns demonstrate a reduction in overrun and a better quality of the preform after application compared to an equivalent material having non-twisted and micro-perforated reinforcing yarns according to the prior art.

3) Effect of Twisting on the Transverse Permeability of the Reinforcing Material:

It is important to validate that the present invention maintains the same level of transverse permeability of the reinforcing material as that obtained with the micro-perforated reinforcing material according to the prior art. This can be defined as the ability of a fluid to pass through a fibrous material. It is measured in $m^2$. The values given below in table 6 were measured with the apparatus and the measurement technique described in the thesis entitled "Problématique de la mesure de la perméabilité transverse de préformes fibreuses pour la fabrication de structures composites" [Measuring the transverse permeability of fibrous preforms for the manufacture of composite structures], by Romain Nunez, defended at the Ecole Nationale Supérieure des Mines de Saint Etienne, on Oct. 16, 2009, which can be consulted for further details.

In particular, the measurement is performed by monitoring the thickness of the sample during the test using two co-cylindrical chambers making it possible to reduce the effect of "race-tracking" (passage of the fluid next to or "on the side" of the material for which the permeability is to be measured). The fluid used is water and the pressure is 1 bar+/−0.01 bar. Preforms of diameter 270 mm were made according to a symmetrical quasi-isotropic stacking, [+45/0/135/90] S, 8 plies.

Table 6 below lists the transverse permeability values measured for fiber volume rates (FVR) of 50%, 55% and 60% on comparative materials 1, 2, and 3 as well as on materials 4 to 12 according to the invention (see Table 3). The transverse permeability values from Table 6 found for the three samples with different fiber volume rates for each material are summarized in FIG. 16.

28

When all the reinforcing yarns are twisted at either 8 turns per meter or 10 turns per meter, the transverse permeability of the material according to the invention (materials 4 and 5) is equivalent to that of a comparative micro-perforated material (comparative material 2) for the three volume rates studied. The choice of twist depends on the titer and the number of filaments in the yarns. A different twist could lead to similar results for yarns having different titers and numbers of filaments.

For a carbon fiber grammage of 280 $g/m^2$, twisting the reinforcing yarns at 10 turns per meter appears to yield better average transverse permeability than for a material that is micro-perforated according to the prior art.

As the number of turns per meter decreases (material 6 compared to materials 4 and 5 and material 9 compared to material 8), the transverse permeability of the material is lower. However, it remains higher than that of a comparative material without micro-perforation (comparative material 1).

As the number of twisted reinforcing yarns decreases, even with a higher number of turns per meter (material 7), the transverse permeability decreases (compared to material 4). In order for twisting the reinforcing yarns to result in improved transverse permeability, it is more effective for all of the reinforcing yarns to be twisted rather than trying to increase the number of turns per meter on an individual twisted reinforcing yarn.

4) Effect of Twisting Reinforcing Yarns on the Mechanical Properties of the Composite:

430 mm×430 mm preforms consisting of a stacking sequence suitable for the carbon grammage were placed in an injection mold under pressure. A frame of known thickness surrounding the preform was used to achieve the desired fiber volume ratio (FVR). The epoxy resin marketed by HEXCEL Corporation, Stamford, CT, USA under the reference HexFlow RTM6 was injected at 80° C. under 2 bars through the preform which is maintained at 120° C. inside the press. The pressure applied by the press was 5.5 bars. After the preform was filled and the resin came out of the mold, the outlet pipe was closed and the curing cycle started (3° C./min to 180° C. followed by a 2 h post-cure at 180° C. and cooling at 5° C./min).

Specimens were then cut to the appropriate size to perform the open hole (OHC) and solid plate (UNC) compression tests summarized in Table 7 below.

TABLE 7

| | UNC | OHC |
|---|---|---|
| Ply orientation | [45/0/135/90]3 s (for grammage 210 g/m2) | [45/0/135/90]3 s (for grammage 210 g/m2) |

TABLE 6

| Material | | Comparative material 1 | Comparative material 2 | Comparative material 3 | Material 4 invention | Material 5 invention | Material 6 invention |
|---|---|---|---|---|---|---|---|
| Transverse | 50% | 4.45E−15 | 2.11E−14 | 1.61E−14 | 2.05E−14 | 2.27E−14 | 1.01E−14 |
| permeability | 55% | 3.40E−15 | 1.63E−14 | 9.79E−15 | 1.39E−14 | 1.45E−14 | 7.81E−15 |
| (m2) | 60% | 2.60−15 | 1.26E−14 | 5.97E−15 | 6.49E−15 | 9.28E−15 | 6.04E−15 |

| Material | | Material 7 Invention | Material 8 Invention | Material 9 Invention | Material 10 Invention | Material 11 Invention | Material 12 Invention |
|---|---|---|---|---|---|---|---|
| Transverse | 50% | 6.72E−15 | 2.83E−14 | 1.88E−14 | 5.79E−15 | 1.64E−14 | 2.17E−14 |
| permeability | 55% | 4.98E−15 | 1.55E−14 | 8.66E−15 | 4.21E−15 | 9.39E−15 | 1.05E−14 |
| (m2) | 60% | 3.69E−15 | 8.55E−15 | 3.98E−15 | 3.06E−15 | 5.37E−15 | 5.10E−15 |

TABLE 7-continued

|  | UNC | OHC |
|---|---|---|
| on the preform | [45/0/135/90]2 s (for grammage 280 g/m2 or 350 g/m2) | [4S/0/135/90]2 s (for grammage 280 g/m2 or 350 g/m2) |
| Test machine | Zwick Z300 | Zwick Z300 |
| Standard EN | 6036 | 6036 |

The tests were performed with eight reinforcing materials 4 to 11 according to the invention and comparative materials 2 and 3 (Table 3). The results of the open hole compression (OHC) tests are shown in Table 8 below.

TABLE 8

| OHC (dry, 23° C.) | Comparative material 2 | Comparative material 3 | Material 4 invention | Material 5 invention | Material 6 invention |
|---|---|---|---|---|---|
| Stress (MPa) | 286 | 270 | 289.2 | 286 | 284.4 |

| OHC (dry, 23° C.) | Material 7 invention | Material 8 invention | Material 9 invention | Material 10 invention | Material 11 invention |
|---|---|---|---|---|---|
| Stress (MPa) | 271.0 | 281.5 | 283.1 | 268.7 | 251 |

It is known in the prior art that the carbon grammage can affect the mechanical results. In general, the higher the carbon weight, the lower the mechanical compression properties tend to be. In the present application, the results are compared to carbon weight.

For a grammage of 210 g/m², there is no difference between the comparative material and the materials according to the invention for open hole compression tests (OHC). The same conclusions can be drawn for grammages of 280 g/m². For grammages of 350 g/m², it is not possible to make comparisons with a micro-perforated material, as this is not feasible.

The results of the compression tests on solid plates (UNC) are shown in Table 9 below.

[TRANSLATOR'S NOTE: [0191] NOT FOUND IN ORIGINAL]

TABLE 9

| UnC (dry, 23° C.) | Comparative material 2 | Comparative material 3 | Material 4 invention | Material 5 invention | Material 6 invention |
|---|---|---|---|---|---|
| Stress (MPa) | 544.0 | 487.1 | 558.5 | 558 | 557.9 |

| UnC (dry, 23° C.) | Material 7 invention | Material 8 invention | Material 9 invention | Material 10 invention | Material 11 invention |
|---|---|---|---|---|---|
| Stress (MPa) | 569.4 | 516.7 | 531.4 | 485.5 | 444 |

The results of Table 9 allow the same conclusions to be drawn as for the open hole tests.

5) Effect of Twisting of Reinforcing Yarns on Transverse Electrical Conductivity:

Preforms of 335 mm×335 mm were made up of reinforcing plies, the number of which depends on the grammage of the carbon reinforcing yarns. The stacking sequence is [0/90] ns, with ns being an integer depending on the grammage of the carbon reinforcing yarns, in order to yield a panel with a final thickness 3 mm and 60% fiber volume. The preforms were then placed in an injection mold under pressure. In the same way as for the mechanical compression tests (see paragraph 4 above), panels of composite reinforcing material/RTM6 were formed by means of an injection process (same parameters as for the compression plates).

A waterjet cutter was used to pre-cut 24 40 mm×40 mm specimens evenly distributed throughout the panel. Both surfaces of the pre-cut panel were then sandblasted to expose the carbon fibers. Next, the front and back sides of the panel were treated to apply a layer of conductive metal, typically tin and zinc by means of an electric arc process. The metal applications can be removed from the specimen fields by sandblasting or sanding. This conductive metal application allows for a low contact resistance between the sample and the measuring instrument. The individual specimens were then cut out of the panel.

A power source (TTi EL302P programmable 30V/2 A power supply, Thurlby Thandar Instruments, Cambridge UK) capable of varying current and voltage was used to determine resistance. The sample was in contact with the two electrodes of the power supply; these electrodes were placed into contact by means of a clamp. Care must be taken to ensure that the electrodes are not in contact with each other or any other metal. A current of 1 A was applied and the resistance was measured by two other electrodes connected to a voltmeter/ohmmeter. The test was performed on each sample to be measured. The conductivity value was then calculated from the resistance value using the dimensions of the sample and the following formulae:

$$\text{Resistivity (Ohm·m)}=\text{Resistance (Ohm)}\times\text{Area (m}^2)/\text{Thickness (m)}$$

$$\text{Conductivity (S/m)}=1/\text{Resistivity}$$

Transverse electrical conductivity tests were performed with the comparative material 2 and materials 4 and 5 according to the invention (Table 3). The test results are shown in Table 10 below.

TABLE 10

|  | Comparative Material 2 | Material 4 invention | Material 5 invention |
|---|---|---|---|
| Transverse electrical conductivity | 7.5 | 23.6 | 34 | comparative material 2 and the materials 4 and 5 according to the invention have the same fiber grammages. The average transverse electrical conductivity of material 4 according to the invention is higher than that of the comparative material 2, which was micro-perforated according to the prior art. Twisting the reinforcing yarns improves the transverse electrical conductivity of the reinforcing material.

[TRANSLATOR'S NOTE: [0203] NOT FOUND IN ORIGINAL]

Part B

The results of a second series of tests performed are presented in Table 11 below. The materials obtained were not micro-perforated with the exception of comparative material 27.

TABLE 11

| Material | Material 19 | Material 20 | Material 21 invention | Material 22 invention | Material 23 |
|---|---|---|---|---|---|
| Reinforcing fibers | Hexcel IM7 12 K | | | Hexcel IMA-12 K | |
| Polymeric binder | 1R8 4 g/m2 per face | | | | |
| Width of web | 6.35 mm | | | 12.7 mm | |
| Number of carbon yarns | 4 | | | 6 | |
| Basis weight of UD reinforcing fibers (g/m2) | 280 | | | 210 | |
| Micro-perforation | No | No | No | No | No |
| Twisting Number of turns per meter | 10 | | | 8 | |
| Number of yarns twisted | | All | | All | |
| Twisting direction | All S | SZZS | SZSZ | All | SZSZSZ |

| Material | Material 24 invention | Material 25 invention | Material 26 | Comparative material 27 |
|---|---|---|---|---|
| Reinforcing fibers | Hexcel IMA 12 K | | Hexcel IMA 12 K | Hexcel IMA 12 K |
| Polymeric binder | 1R8 4 | | g/m2 par face | |
| Width of web | 12.7 mm | | 38.1 mm | 12.7 mm |
| Number of carbon yarns e | 6 | | 18 | 6 |
| Basis weight of UD reinforcing fibers (g/m2)) | 210 | | 210 | 210 |
| Micro-perforation | No | No | No | Yes |
| Twisting Number of turns per meter | | 8 | 8 | NA |
| Number of yarns twisted | | All | All | NA |
| Twisting direction | All Z | SSZZSS | 7 S yarns, 5 Z yarns and 6 S yarns | NA |

Manufacture of Reinforcing Materials According to the Invention

These tests were performed on a new production line that meets the requirements of industrial scale production, which requires not only higher production rates, with the aim of reducing production line stoppages and the wear of the components of the line, but also increased safety. Such increases in speed also increase the overall inertia of the line, generate a greater number of frictional events of the materials on the various points/rollers of the line, and thus notably on the force necessary to drive the belts. Consequently, the production line previously described in connection with FIG. 19, was modified by introducing a motorization of the continuous belts 15a and 15b. The belts 15a and 15b were motorized independently of each other by means of rollers 14a and 14c, the rollers 14b and 14d remaining free to rotate.

This increase in production rates highlights the difficulties encountered in the production of unidirectional webs with a minimized presence of defects such as gaps between yarns, overlapping, or corrugation, with the use of twisted reinforcing yarns all having the same type of S-twist or Z twist. Indeed, despite the use of a comb or a guide roller, the trajectory of the reinforcing yarns is not totally controlled, which results in the appearance of defects. These risks can be minimized or even avoided, by using mixed S/Z unidirectional webs, as proposed within the scope of the invention.

Several materials 19 were manufactured in parallel on this industrial-scale production line and therefore had higher production rates.

As in the first series of tests, several reinforcing materials according to the invention, in the form of tapes, were manufactured simultaneously.

Similarly, several materials 20 and several materials 21 were manufactured in parallel. It was found that the materials 20 and 21 obtained, compared to the materials 19, were more regular, particularly at the edges. Indeed, the quality of yarn alignment was better during the formation of the unidirectional webs, in the case of materials 20 and 21. As a result, the distance between two unidirectional webs manufactured side by side was more regular, thereby facilitating, between two formed unidirectional webs, cutting the two veils laminated on the two faces thereof.

The same observation was made for materials 22 and 23, and 24 and 25. In the case of material 22, which has only S-twist yarns, more defects such as wrinkles, gaps or overlaps between yarns, and irregularities at the edges were observed than in the case of material 23, which uses a sequence of SZSZSZ yarns. Similarly, in the case of material 24, which comprises only Z-twist yarns, more defects such as wrinkles, gaps or overlaps between yarns, irregularities at the edges, were observed than in the case of material 25, using a sequence of SSZZSS yarns.

Further, in the case of material 26 comprising 18 yarns, having the sequence 7 S-twist yarns, 5 Z-twist yarns, then 6 S-twist yarns, the formation of a unidirectional web by the process previously described resulted in the unidirectional web as shown in FIG. 18. As can be seen in this figure, there is a marked gap at the junction of 7 S-twist yarns/5 Z-twist yarns, which constitutes a quality defect with the creation of a continuous gap of more than 1 mm wide along the entire length of the web. The group of Z-twist yarns is drawn to the right, while the groups of S-twist yarns are drawn to the left. This results in an unsatisfactory continuous gap. This sequence does not correspond to the definitions P1, P2, I1 and 12 for mixed S/Z unidirectional webs given in the context of the invention, which lead to unidirectional webs that are more balanced in terms of the number of S-twist and Z-twist yarns, and having greater coverage due to a reduction in the risk of inter-yarn gaps.

Thus, within the scope of the invention, it was observed that there were deflection phenomena for the trajectory of the reinforcing yarns during the formation of unidirectional webs with twisted reinforcing yarns having the same twist or having configurations that do not correspond to the definitions P1, P2, I1, and 12 for mixed S/Z unidirectional webs, given within the scope of the invention, despite the use of guiding devices or combs. These phenomena do not occur for unidirectional webs with only 3 or fewer yarns. The use of mixed S/Z unidirectional webs proposed within the scope of the invention solves the problem for unidirectional webs consisting of more than 3 yarns.

Moreover, the deflection phenomena were exacerbated with an increase of the width of the reinforcing materials produced. The problem is even more pronounced for production widths greater than 7 mm, or even 12 mm. The risks of deflection of the reinforcing yarns, which are solved with the mixed unidirectional S/Z webs proposed within the scope of the invention, arise regardless of the manufacturing method used, that is, whether or not a plurality of reinforcing materials is manufactured in parallel. Indeed, the deflection phenomena, if they do occur, also cause difficulties during the application of the materials according to the invention, leading to an unsatisfactory positioning.

Automated Application of Reinforcing Materials According to the Invention

Materials 19 to 25 were applied by means of an automated application device, comprising a guide consisting of a guide groove in which the material circulates, before being applied to the application surface. This guide makes it possible to ensure that the web is properly positioned at the outlet of the application head of the device that will then make it possible to the application head to well control the trajectory of the material of reinforcing and its positioning on the application surface, as can be seen in the photographs presented in left part of FIG. 17. As illustrated in FIG. 17, for the evaluation of the materials, an application was performed on a planar surface, by applying one next to the other, in order to obtain a joint application, of a series of parallel strips of material 19 (SSSS). The same procedure was followed with material 20 (SZZS) and material 21 (SZSZ). With these last two materials, the application is better controlled, which results in the reduction of gaps and corrugations on the application surface. By observing the behavior of the materials within the guide groove, it was noted that improper centering of material 19 (SSSS) occurred, so that is abutted one of the edges of the groove, whereas the materials 20 and 21 were quite well centered in the groove and in support on its two edges.

The same findings were observed firstly for materials 22 and 23, and secondly for materials 24 and 25. In the case of material 22 comprising only S-twist yarns, the application is not as good, as compared to the use of material 23, using a series of SZSZSZ yarns. Similarly, in the case of material 24 comprising only Z-type yarns, more gaps were observed than in the case for material 25, using a series of SSZZSS yarns. Table 12 shows the average gap width obtained between two strips, measured with a ruler, in the case for the applications of materials 24 and 25.

TABLE 12

| Material | 25 (SSZZSS) | 24 (ZZZZZZ) |
|---|---|---|
| Number of bands applied | 8 | 8 |
| Average gap (mm) | 0.1 mm | 1.5 mm |

It is clear that the use of the SSZZSS web, consisting of both S-twist and Z-twist yarns, results in a clear reduction of zones without reinforcing yarns in the resulting unidirectional web.

Number of strips 8 8 applied Average gap (mm) 0.1 mm 1.5 mm

Performance of Materials According to the Invention

The performance of materials according to the invention was evaluated, according to the methods described in PART A.

Whether the unidirectional web consists solely of S-twist or Z-twist yarns, or whether the unidirectional web consists of both S-twist yarns and Z-twist yarns, the advantages of using the twisted yarns proposed in the context of the invention, in terms of decrease in the ratio of vacuum thickness to non-vacuum thickness, decrease in overrun, improvement in the transverse permeability of the material, and improvement in the transverse electrical conductivity of the material, are retained.

The mechanical performance is very satisfactory, due to a reduction in defects in the reinforcing materials produced.

The results obtained are presented in Table 13 below:

[TRANSLATOR'S NOTE: [0227] NOT FOUND IN ORIGINAL]

TABLE 13

| Material | Comparative material 27 | Material 23 invention |
|---|---|---|
| OHC dry, 23° C. Stress MPa | 263 | 281 |
| UnC dry, 23° C. Stress MPa | 533 | 549 |

The overrun performance is improved for the unidirectional web consisting of both S-twist yarns and Z-twist yarns, as compared to comparative micro-perforated material 27. Thus, the overrun performance is improved whether the material has a unidirectional web consisting of a series of yarns twisted in the same direction, or a unidirectional web consisting of a mixture of S-twisted and Z-twisted yarns. The results obtained are presented in table 14 below:

TABLE 14

| Material | Comparative material 27 | Material 23 invention |
|---|---|---|
| thickness divided by theoretical thickness for 60% FVR | 1.6 | 1.3 |

Transverse permeability performance was also measured on material 23 according to the invention and compared to that of comparative material 27, and is presented below in Table 15. The transverse permeabilities obtained are comparable for the two materials.

TABLE 15

| Material | | Comparative material 27 | Material 23 invention |
|---|---|---|---|
| Permeability (m*) | 58% FVR | 5.54E−15 | 5.01E−15 |
| | 60% FVR | 4.97E−15 | 4.02E−15 |
| | 62% FVR | 4.15E−15 | 3.21E−15 |

Transverse electrical conductivity performance was also measured on material 23 according to the invention, and is presented in Table 16 below:

TABLE 16

| Material | Material 23 |
|---|---|
| Transverse electrical conductivity (S/m) | 12.3 |

Material 23 according to the invention provides good electrical properties compared to comparative material 2.

The invention claimed is:

1. A reinforcing material comprising:
   (a) a unidirectional reinforcing web formed of a plurality of carbon reinforcing yarns;
   (b) a layer of nonwoven material, comprising polymeric fibers affixed to each to each side of said unidirectional reinforcing web, said layers of nonwoven material comprising from 2 to 6% of the total weight of the reinforcing material;
   (c) wherein said reinforcing yarns each have a twist of 3 turns/m to 15 turns/m; and
wherein all the carbon reinforcing yarns forming the unidirectional reinforcing web are individually twisted, the two possible directions of twist being denominated as either S-twist or Z-twist, and having a twist of 3 turns/m to 15 turns/m, the unidirectional reinforcing web comprising at least 3 carbon reinforcing yarns thus twisted with at least one S-twist reinforcing yarn and at least one Z-twist reinforcing yarn:
   wherein, when the total number of twisted carbon reinforcing yarns forming the unidirectional reinforcing web is even, the number of twisted carbon reinforcing S-twist yarns on one side of a plane Δ and the number of twisted carbon reinforcing S-twist yarns on the other side of the plane Δ, each of which is, independently, an integer in the range {[(total number of yarns)/4]−35%; [(total number of yarns)/4]+35%}, each endpoint of the range being rounded to the nearest integer if the formula defining it result in an integer, the other twisted carbon reinforcing yarns being Z-twist yarns;
   wherein, when the total number of twisted carbon reinforcing yarns forming the unidirectional reinforcing web is odd, the number of twisted carbon reinforcing S-twist yarns on one side of the plane Δ and the number of twisted carbon reinforcing S-twist yarns on the other side of the plane Δ, which are either two integers or two and a half integers, and are, each independently, in the range {[(total number of yarns)/4]−35%; [(total number of yarns)/4]+35%}, each endpoint of the range being rounded to the nearest integer or integer and a half if the formula defining it results in an integer or integer and a half, the other twisted carbon reinforcing yarns being Z-twist yarns;
the plane Δ being the plane parallel to the general direction of extension of said unidirectional web and which divides said unidirectional web into two equal parts, being perpendicular to its surface.

2. The reinforcing material according to claim 1, characterized in that the unidirectional reinforcing web has a weight within the range from 126 g/m2 to 280 g/m2.

3. The reinforcing material according to claim 1, wherein the reinforcing yarns of having a titer of 3 to 24 K.

4. The reinforcing material according to claim 1, characterized in that it has a width greater than 12 mm.

5. The reinforcing material according to claim 4, characterized in that the polymeric fiber layers comprise fibers made of a thermoplastic polymer, a partially crosslinked thermoplastic polymer, a mixture of such polymers, or a mixture of thermoplastic and thermosetting polymers.

6. The reinforcing material according to claim 5, characterized in that said nonwoven materials have a basis weight within the range from 0.2 g/m2 to 20 g/m2 and a thickness of 0.5 microns to 50 microns.

7. The reinforcing material according to claim 6, characterized in that it is neither perforated, nor sewn, nor knitted, nor woven.

8. A method for preparing a reinforcing material comprising the following successive steps:
   a1) providing a unidirectional reinforcing web formed of one or more reinforcing yarns, each of said yarns being individually twisted and having a twist of 3 turns/m to 15 turns/m,
   a2) providing at least two layers of polymeric fibers in the form of nonwoven materials,
   a3) associating each of the polymeric fiber layers with each of the faces of the unidirectional reinforcing web.

9. The method according to claim 8, characterized in that it comprises, upstream of step a1), a step for the production of the unidirectional reinforcing web comprising the application of a twist of 3 turns/m to 15 turns/m to a reinforcing yarn or to a series of yarns, said twist being applied to each yarn individually.

10. The method according to claim 9, characterized in that the unidirectional reinforcing web is formed of a plurality of reinforcing yarns and in that the method comprises, upstream of step a1): i) applying a twist of 3 to 15 turns/m to a series of reinforcing yarns, said twist being applied to each yarn individually, ii) aligning the twisted yarns thereby obtained, with other reinforcing yarns, and arranging said yarns side by side, so as to form a unidirectional reinforcing web.

11. A reinforcement material for use as an infusion preform comprising:
   (a) at least one layer of fibrous reinforcing material comprising a plurality of unidirectional carbon fiber yarns, said yarns being coplanar and arranged next to each other in a parallel direction;
   (b) each of said carbon fiber yarns having been subjected to rotational twisting along its longitudinal axis, said twisting being denominated as either S-twist or Z-twist, said carbon fiber yarns being subjected to twisting of between 3 turns/meter and 15 turns/meter;
   (c) the carbon fiber yarns of a given layer of said fibrous reinforcing material being subjected to S-twist or Z-twist in equal numbers, whereby half of said carbon fiber yarns will have S-twist and half will have Z-twist; and (d) a layer of non-woven polymeric thermoplastic material in the form of a veil or mesh being affixed to both the top and bottom of said reinforcement material, said layers of non-woven polymeric thermoplastic material comprising between 2 and 6% by weight of the reinforcement material.

12. The reinforcement material of claim 11, wherein the twists utilized for the carbon fiber yarns within a layer of fibrous reinforcing material are chosen from the following sequences: SZ, SZS, ZSZ, SZZS, SZSZ, SZSZS, SSZZSS, SZSSZS, SZSZSZ, and SSZZSSZZ.

\* \* \* \* \*